(12) United States Patent
Tokui et al.

(10) Patent No.: US 7,465,104 B2
(45) Date of Patent: Dec. 16, 2008

(54) DISPLAY

(75) Inventors: Kei Tokui, Chiba (JP); Kenichi Iwauchi, Matsudo (JP)

(73) Assignee: Sharp Kabushiki Kaisha, Osaka (JP)

( * ) Notice: Subject to any disclaimer, the term of this patent is extended or adjusted under 35 U.S.C. 154(b) by 3 days.

(21) Appl. No.: 10/561,623

(22) PCT Filed: Apr. 28, 2004

(86) PCT No.: PCT/JP2004/005669

§ 371 (c)(1),
(2), (4) Date: Sep. 15, 2006

(87) PCT Pub. No.: WO2004/114004

PCT Pub. Date: Dec. 29, 2004

(65) Prior Publication Data

US 2007/0008458 A1    Jan. 11, 2007

(30) Foreign Application Priority Data

Jun. 20, 2003    (JP)    ............... 2003-176282

(51) Int. Cl.
*G02F 1/1335*    (2006.01)
(52) U.S. Cl. .................... 385/65; 385/62
(58) Field of Classification Search ........... 349/65, 349/62
See application file for complete search history.

(56) References Cited

U.S. PATENT DOCUMENTS

| | | | |
|---|---|---|---|
| 5,636,072 A | 6/1997 | Shibata et al. | |
| 5,774,257 A | 6/1998 | Shibata et al. | |
| 5,801,793 A * | 9/1998 | Faris et al. | 349/5 |
| 5,828,427 A * | 10/1998 | Faris | 349/5 |
| 5,953,469 A | 9/1999 | Zhou | |
| 6,104,447 A * | 8/2000 | Faris | 349/5 |
| 6,381,381 B1 * | 4/2002 | Takeda et al. | 385/16 |
| 6,438,282 B1 * | 8/2002 | Takeda et al. | 385/16 |
| 6,470,115 B1 * | 10/2002 | Yonekubo | 385/32 |
| 6,591,037 B2 * | 7/2003 | Yonekubo | 385/32 |
| 6,608,657 B2 | 8/2003 | Hiyama et al. | |
| 6,917,391 B1 * | 7/2005 | Faris | 349/12 |
| 7,058,252 B2 * | 6/2006 | Woodgate et al. | 385/16 |
| 7,110,052 B1 * | 9/2006 | Faris et al. | 349/5 |
| 2002/0001431 A1 * | 1/2002 | Yonekubo | 385/32 |
| 2002/0018034 A1 | 2/2002 | Ohki et al. | |
| 2002/0031294 A1 * | 3/2002 | Takeda et al. | 385/16 |

(Continued)

FOREIGN PATENT DOCUMENTS

JP    07-287176    10/1995

(Continued)

*Primary Examiner*—K. Cyrus Kianni
(74) *Attorney, Agent, or Firm*—David G. Conlin; Steven M. Jensen; Edwards Angell Palmer & Dodge LLP

(57) ABSTRACT

In a display device of the invention, driving of the piezoelectric element is controlled to change the light path of the propagating light inside a light guiding plate. By illuminating a liquid crystal panel in this manner, an illumination time and a no illumination time can be provided for the liquid crystal panel within one frame period. This realizes impulse-type-like display in displaying moving images on the liquid crystal panel, and thereby improves an image quality of moving images. Further, since the light is used only in desired regions, spontaneous luminance can be improved and the light can be used more efficiently.

14 Claims, 18 Drawing Sheets

U.S. PATENT DOCUMENTS

| | | | |
|---|---|---|---|
| 2002/0063817 A1* | 5/2002 | Nauta et al. | 349/65 |
| 2002/0154256 A1* | 10/2002 | Gotoh et al. | 349/65 |
| 2003/0142905 A1* | 7/2003 | Yonekubo | 385/32 |
| 2003/0201969 A1 | 10/2003 | Hiyama et al. | |
| 2005/0007514 A1* | 1/2005 | Faris et al. | 349/58 |
| 2005/0018272 A1 | 1/2005 | Kimura | |
| 2005/0093813 A1 | 5/2005 | Yamamoto et al. | |
| 2005/0265028 A1* | 12/2005 | Creemers et al. | 362/297 |
| 2006/0038769 A1* | 2/2006 | Marra et al. | 345/102 |
| 2006/0077688 A1* | 4/2006 | Uehara et al. | 362/613 |
| 2006/0250550 A1* | 11/2006 | Tanaka et al. | 349/114 |

FOREIGN PATENT DOCUMENTS

| | | |
|---|---|---|
| JP | 2000-066168 | 3/2000 |
| JP | 2000-275604 | 10/2000 |
| JP | 2001-159871 | 6/2001 |
| JP | 2001-235729 | 8/2001 |
| JP | 2002-049037 | 2/2002 |
| JP | 2002-049325 | 2/2002 |
| JP | 2003-029170 | 1/2003 |
| JP | 2004-152515 | 5/2004 |
| WO | WO-02/21042 | 3/2002 |
| WO | WO-03/040616 | 5/2003 |
| WO | 2004/027499 | 4/2004 |

* cited by examiner (A)　　　(B)

DISPLAY

TECHNICAL FIELD

The present invention relates to a display device that provides an improved quality of moving images and improved efficiency of using light.

BACKGROUND ART

Conventionally, the cathode ray tube (hereinafter "CRT") has been widely used as a display device for displaying characters and images. However, due to the CRT's large size and large power consumption, the liquid crystal display device (hereinafter, "LCD") has been widely spreading.

However, in displaying moving images on LCD, deterioration of image quality known as streaking or blurring is caused due to the display principle as described below.

In CRT, a dot-like electron beam is scanned to perform display. This is an impulse-type display in which light is emitted only momentarily at a given location of the display screen. On the other hand, in LCD, light always illuminates the liquid crystal panel with a backlight or the like. This is a hold-type display in which the display, except in black display, is continuous at a given location (pixel) of the display screen.

In the impulse-type display, there is no ghosting because the eyes track the instantaneous motions of moving images. On the other hand, in the hold-type display, since the display is continuous, it appears as though the same image were displayed at two different locations at one instance. This causes streaking and blurring. Further, the extent of streaking and blurring varies depending on the displacement of a displayed object between frames. That is, the extent of streaking and blurring varies depending on the speed of the observer's viewpoint tracking the displayed object. This is particularly prominent in large LCD.

As to the deterioration of moving image quality caused by failed gradations resulting from an insufficient response speed of the liquid crystal, the deficiency can be alleviated by increasing the response speed of the liquid crystal. However, since the display mode remains as the hold-type, the deterioration of moving image quality cannot be overcome completely simply by increasing the response speed of the liquid crystal.

One way to solve this problem is to provide an illumination period and a non-illumination period for the liquid crystal panel within one frame period, and thereby provides an impulse-type-like display mode from the hold-type display mode. Further, since gradation data is written by scanning each pixel of the liquid crystal panel line sequentially, the response of the liquid crystal completes at different times on the display screen. In order to prevent deterioration of image quality due to a response delay of the liquid crystal, there has been proposed a method in which a plurality of illumination regions are provided on the backlight and these illumination regions are sequentially illuminated to achieve impulse-type-like display.

For example, as illustrated in FIG. 19, Patent Document 1 discloses a display device using a direct-type backlight for a single-panel liquid crystal display section 300 (liquid crystal panel), wherein the backlight houses a plurality of light sources 301 in a housing that also serves as a light reflector 302. In the display device, the backlight is divided into a plurality of illumination regions with the light sources 301, so that each light source 301 can be turned on and off for each illumination region according to the response state of the liquid crystal display section 300. This is known to improve the quality of moving images by causing the liquid crystal display section 300 to display moving images in an impulse-type-like display mode.

Patent Document 2, another conventional example, discloses a display device using a side edge-type backlight, in which a polymer dispersed-type liquid crystal interposed between transparent electrodes is disposed on a back side of a light guiding plate. In the display device, the transparent electrodes are formed in stripe patterns, and, under applied voltage, the refractive index of the liquid crystal layer is changed so as to control passage and scattering of light propagating through the liquid crystal layer. With this control, the liquid crystal panel can be illuminated by scattering light in regions selected by the stripe transparent electrodes. This is known to improve the quality of moving images in an impulse-type-like display mode.

In a different technical area, a display device has been proposed in which a light guiding plate and actuators are used, as disclosed in Patent Document 3 for example. In the display device, a light source is provided on an end surface of the light guiding plate, and the actuators are provided on the opposite surface of the display surface of the light guiding plate. The actuators are used to emit light that propagates through the light guiding plate. In portions of the light guiding plate in contact with the actuators, the conditions of total reflection are not satisfied for the light propagating through the light guiding plate, and as such the light scattered by the actuators is emitted from the surface of the light guiding plate opposite the actuator. Further, in the display device, a multiplicity of micro actuators are provided to respectively correspond to the pixels, and gradations are realized according to the duration in which the actuators are in contact with or not in contact with the light guiding plate. In order to perform color display in the display device, it has been proposed to provide color filters for the respective actuators corresponding to the pixels.

[Patent Document 1]
Japanese Laid-Open Patent Publication No. 275604/2000 (Tokukai 2000-275604; published on Oct. 6, 2000)

[Patent Document 2]
Japanese Laid-Open Patent Publication No. 49037/2002 (Tokukai 2002-49037; published on Feb. 15, 2002)

[Patent Document 3]
Japanese Laid-Open Patent Publication No. 287176/1995 (Tokukaihei 7-287176; published on Oct. 31, 1995)

However, the foregoing conventional techniques have the following problems. With the plurality of illumination regions divided according to the plurality of light sources 301 as in the display device of Patent Document 1 for example, at least the same number of light sources needs to be provided for the number of illumination regions provided. This poses the problems of increased cost and increased device size. Further, since the illumination regions need to be divided by partitions or the like, the quantity of illumination light on the illumination plane becomes different between portions where the partitions are provided and portions where the partitions are not provided, with the result that luminance non-uniformity is caused.

Further, since the cold cathode tubes, the light sources 301, are turned on and off repeatedly, the light sources 301 have a short life. Further, this causes color breakup deterioration of image quality when the light source is turned off, owing to the fact that the fluorescence of different colors (e.g., red, green, blue) in the cold cathode tubes has different persistence times.

Further, in the display device in which polymer dispersed-type liquid crystal is disposed on a back side of the light guiding plate as in the display device of Patent Document 2 for example, the light propagates through the liquid crystal layer, which generally does not have good transmittance. As a result, a propagation distance of light is increased particularly in a large LCD, in which streaking and blurring are prominent. This leads to a large loss of light and poor light using efficiency.

Further, since the propagation distance of light before it leaves the light guiding plate is different between a portion near the light source and a portion far away from the light source, the quantity of light absorbed by the liquid crystal layer is also different. That is, the quantity of propagation light is different in different parts of the display plane, with the result that luminance non-uniformity is caused.

Further, by the time light reaches the liquid crystal inside the liquid crystal panel where images are displayed, the quantity of light has been reduced due to the passage through the polarizer. However, the quantity of light that propagates through the light guiding plate and the polymer dispersed-type liquid crystal and scattered therein is greater by more than 10 fold than the quantity of light that passes through the liquid crystal panel. Such a large light quantity causes degradation of the polymer dispersed-type liquid crystal. This is particularly made serious by the UV light contained in the light emitted from the cold cathode tubes.

Further, in the display device in which the light guiding plate and actuators are used as in the display device of Patent Document 3 for example, the actuators need to be provided to respectively correspond to the pixels. Further, the actuators need to be separated from one another to allow for independent control for each pixel. For these reasons, in the display device, there is a gap between the actuators. This reduces the numerical aperture and thereby the efficiency of using light. Further, the resolution is inferior compared with the LCD of the same screen size. Further, since gradations are realized only with the actuators, a fast operation is required for the actuators. This poses the problems of productivity and cost.

DISCLOSURE OF INVENTION

In order to solve the foregoing problems, the present invention provides a display device which includes a liquid crystal panel having a plurality of pixels, and an illuminating unit for illuminating the liquid crystal panel using a light guiding plate, wherein the illuminating unit includes light path changing means for changing, by being brought into contact with or not in contact with the light guiding plate, a light path of propagating light inside the light guiding plate, so as to change intensity of light illuminating the liquid crystal panel.

According to this arrangement, the light path changing means varies the intensity of light illuminating the liquid crystal panel, and thereby provides an illumination period and a non-illumination period for the liquid crystal panel. This enables the liquid crystal panel to display moving images in an impulse-type-like display mode, thereby improving a quality of moving images.

Further, in the foregoing arrangement, the light propagating through the light guiding plate illuminates the liquid crystal panel in an illuminated state. In a non-illuminated state, the propagation light is totally reflected in the light guiding plate. Because the propagation light is maintained by being totally reflected in the light guiding plate in a non-illuminated state, a display device is realized in which the spontaneous luminance of light illuminating the liquid crystal panel is increased, and in which light is used efficiently with minimum light loss.

Additional objects, features, and strengths of the present invention will be made clear by the description below. Further, the advantages of the present invention will be evident from the following explanation in reference to the drawings.

BEST MODE FOR CARRYING OUT THE INVENTION

The following will describe the present invention in more detail based on embodiments. It should be noted however that the present invention is not limited any way by the following description.

First Embodiment

Referring to the attached drawings, one embodiment of the present invention is described below. Note that, the drawings are exaggerated for illustrative purposes, and the size or intervals are not scaled.

Figure 1:
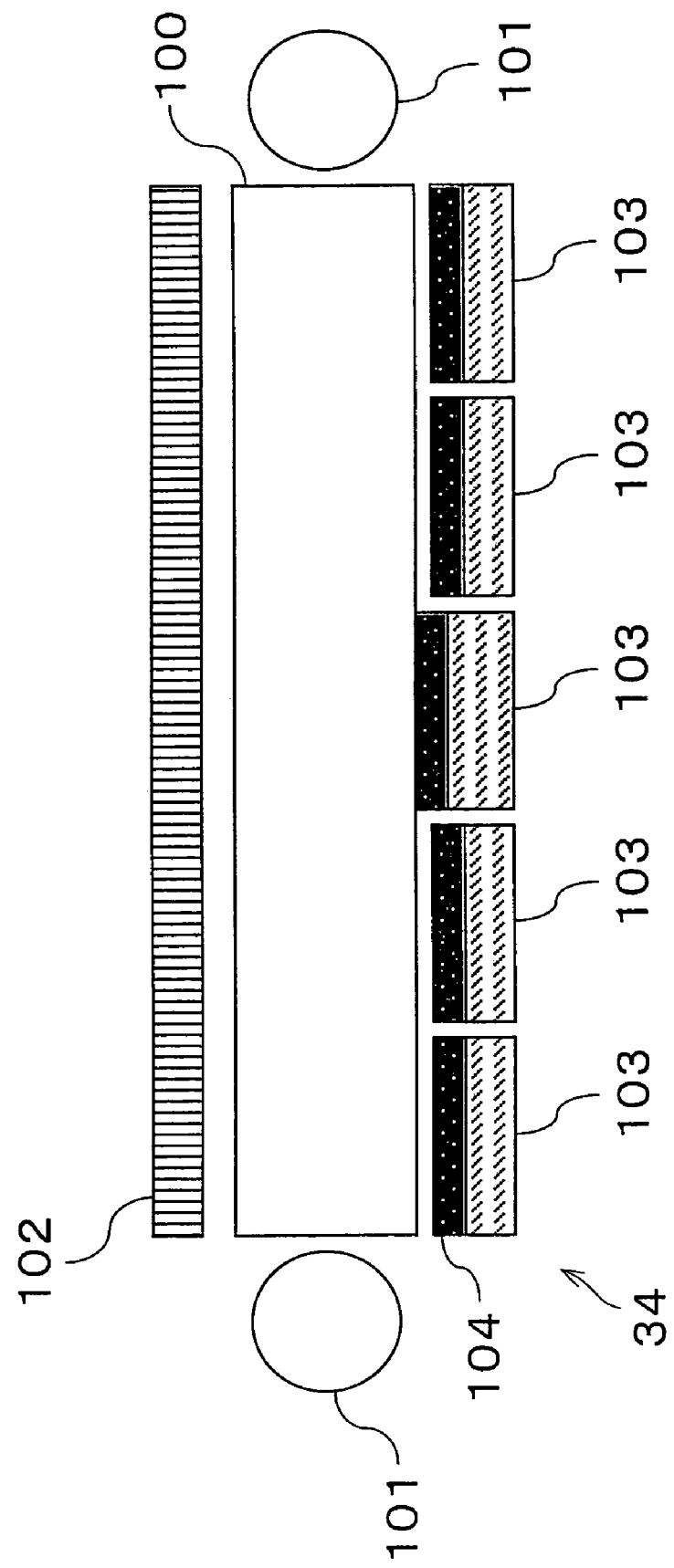
FIG. 1 is a cross sectional view illustrating an exemplary structure of a display device according to a First Embodiment of the present invention.

As illustrated in FIG. 1, a liquid crystal display device according to the present embodiment includes a light guiding plate 100, light sources (light emitters) 101 provided on both ends of the light guiding plate 100, a liquid crystal panel 102 provided on one surface of the light guiding plate 100, and a light path control section (light path changing means) 34 provided on the other surface of the light guiding plate 100 opposite the liquid crystal panel 102. In the present embodiment, the light guiding plate 100, the light sources 101, and the light path control section 34 realize an illuminating unit (backlight) for the liquid crystal panel 102.

The liquid crystal panel 102 includes a multiplicity of pixels disposed in a matrix, and displays images by varying the transmittance of light at each pixel according to a signal voltage applied to each pixel and produced based on video signals for LCD display. The video signals include a data signal, a horizontal synchronous signal, and a vertical synchronous signal, among others. The liquid crystal panel 102 is installed in the vicinity of or in contact with one surface of the light guiding plate 100, substantially parallel to this surface of the light guiding plate 100.

The light sources 101 are realized by cold cathode tubes for example. Specifically, one or more (for example, two) cold cathode tubes are installed on opposing side surfaces of the light guiding plate 100 substantially rectangular in shape, so that the light from each cold cathode tube enter the light guiding plate 100. That is, the cold cathode tubes are disposed such that their lengthwise directions are along the lengthwise directions of the side surfaces of the liquid crystal panel 102.

The foregoing described an example in which the light source 101 is the cold cathode tube, which is a linear light source. However, a point light source such as a light emitting diode may be used as the light source 101 as well. Further, in the foregoing example, the light sources 101 are respectively disposed on the opposing two side surfaces of the light guiding plate 100. However, three or four light sources 101 may be respectively provided on the side surfaces of the light guiding plate 100, in order to improve luminance of a displayed image on the liquid crystal panel 102.

Between the liquid crystal panel 102 and the light guiding plate 100, various types of optical sheets, for example, such as a diffusing sheet or a reflecting-and-polarizing sheet (not shown) are provided. Further, the light sources 101 may be surrounded by a member with a high reflectance. In this way, the quantity of light into the light guiding plate 100 can be increased, and the light can be used more efficiently.

Further, a reflecting member such as a mirror or a white PET (polyethylene terephthalate) may be disposed on a side surface of the light guiding plate 100 not provided with the light source 101. The efficiency of using light can also be improved this way.

The light path control section (light path changing means) 34 is selectively brought into contact with the light guiding plate 100 to change the light path of the propagating light in the liquid guiding plate 100 and thereby vary the intensity of the light illuminating the liquid crystal panel 102 from the surface of the light guiding plate 100. It is preferable that the light path control section 34 be provided for each illumination region which controls the state of illumination (ON/OFF) of light shone on the liquid crystal panel 102 from the surface of the light guiding plate 100.

Further, it is preferable that the light path control section 34 be installed in such a manner that, when not in contact with the light guiding plate 100, one surface of the light path control section 34 is in the vicinity of and substantially parallel to one surface of the light guiding plate 100 (surface on the far side of the liquid crystal panel 102).

The light path control section 34 includes a piezoelectric element 103, and a membrane-like organic resin 104 formed over the entire surface of the piezoelectric element 103 on the light guiding plate 100 side. The piezoelectric element 103 is a displacement portion that is displaced (expands and contracts) in the direction of thickness of the light guiding plate 100 according to applied voltage.

Each piezoelectric element 103 is controlled in synchronism with a scanning signal for the liquid crystal panel 102 and to illuminate a region of the liquid crystal panel 102 in which the liquid crystal has responded almost completely, as will by described later. As a result, the light propagating through the light guiding plate 100 leaves the light guiding plate 100 and enters a desired region of the liquid crystal panel 102 at a desired timing.

The piezoelectric element 103 has a multi-layer structure in which a plurality of electrode layers and a plurality of piezoelectric layers are stacked in the direction of thickness, wherein the electrode layer includes a metal such as aluminum, silver, copper, platinum, titanium, or molybdenum, and wherein the piezoelectric layer includes a piezoelectric ceramic such as barium titanate, lead titanate, or lead zirconium. With such a stacked structure, displacement occurs in the direction of thickness of the piezoelectric layers (thickness direction of the light guiding plate 100) according to applied voltage.

The organic resin 104 is made of polyvinyl alcohol, polyisoprene, or the like, and it constitutes a contact portion that is brought into contact with one surface of the light guiding plate 100. As the organic resin 104 is brought into contact with the light guiding plate 100, the light path of the propagating light inside the light guiding plate 100 is changed, and the intensity of the light shone on the liquid crystal panel 102 from the other surface of the light guiding plate 100 is varied.

The organic resin 104 is provided to scatter light (detailed principle will be described later). Since the pixels do not require color filters with poor transmittance, the organic resin 104 can have a white color, which scatters and reflects light of a visible light wavelength range used for display. As a result, light can be used more efficiently. In order to ensure a contact with the light guiding plate 100, it is preferable that the organic resin 104 be elastic. Further, for efficient scattering of light, the organic resin 104 is preferably white in color.

Figure 2:
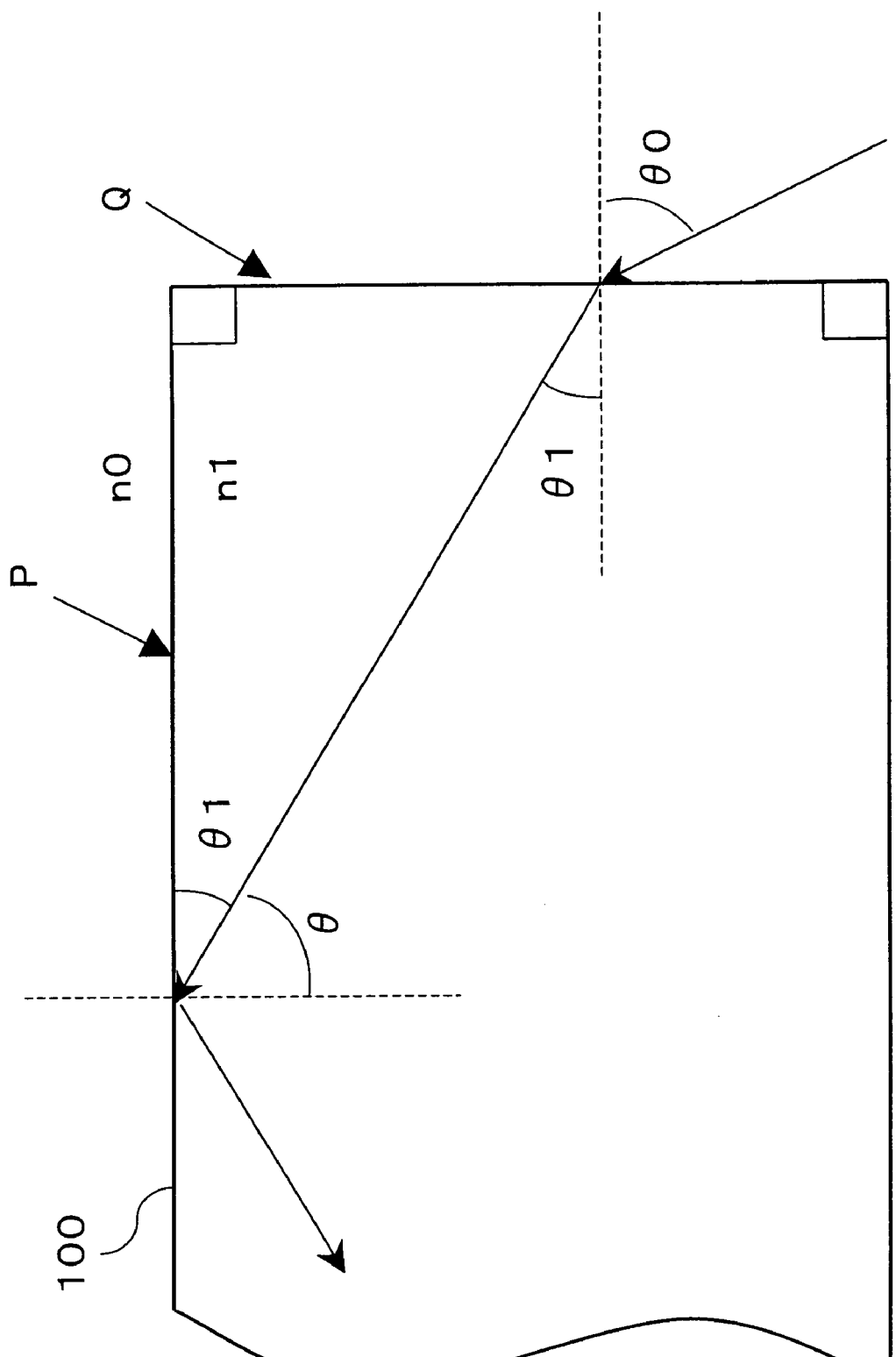
FIG. 2 is an enlarged cross sectional view of a light incident end surface of a light guiding plate of the display device according to the First Embodiment of the present invention.

FIG. 2 illustrates how light is totally reflected inside the light guiding plate 100. The conditions of total reflection is given by Expression (1) below, where n0 is the refractive index of air, n1 is the refractive index of the light guiding plate 100, and θ is the angle of incidence with respect to normal to principle surface P of the light guiding plate 100. If light is incident on the principle surface P of the light guiding plate 100 at angle θ that satisfies Expression (1), then the propagating light is totally reflected at reflection angle θ. Further, when the incident angle of the light incident on side surface Q of the light guiding plate 100 is θ0 (angle with respect to normal to side surface Q), and when the angle of refraction of the incident light is θ1, these angles are related to each other as represented by Expression (2). Further, since θ1 and θ supplement each other, the angles can be represented by Expression (3) below. It follows from this that θ and θ0 are related to each other as represented by Expression (4). When n0 is 1, n1 greater than $\sqrt{2}$ causes all incident light to be totally reflected inside the light guiding plate 100, irrespective of the incident angle on the side surface of the light guiding plate 100.

$$\sin \theta \geq n0/n1 \quad (1)$$

$$\sin \theta 1 = (n0/n1)\sin \theta 0 \quad (2)$$

$$\cos \theta = (n0/n1)\sin \theta 0 \quad (3)$$

$$(n1)^2 \geq \sin^2 \theta 0 \quad (4)$$

As a material of the light guiding plate 100, polymethyl methacrylate (PMMA) having superior transmittance is generally used. The refractive index of PMMA is about 1.49, which is greater than $\sqrt{2}$. Therefore, the light incident on the side surface of the light guiding plate 100 generally propagates through the light guiding plate 100 without any reflection loss, and does not emerge from the light guiding plate 100 until the light reaches the opposing side surface of the light guiding plate 100.

Figure 3:
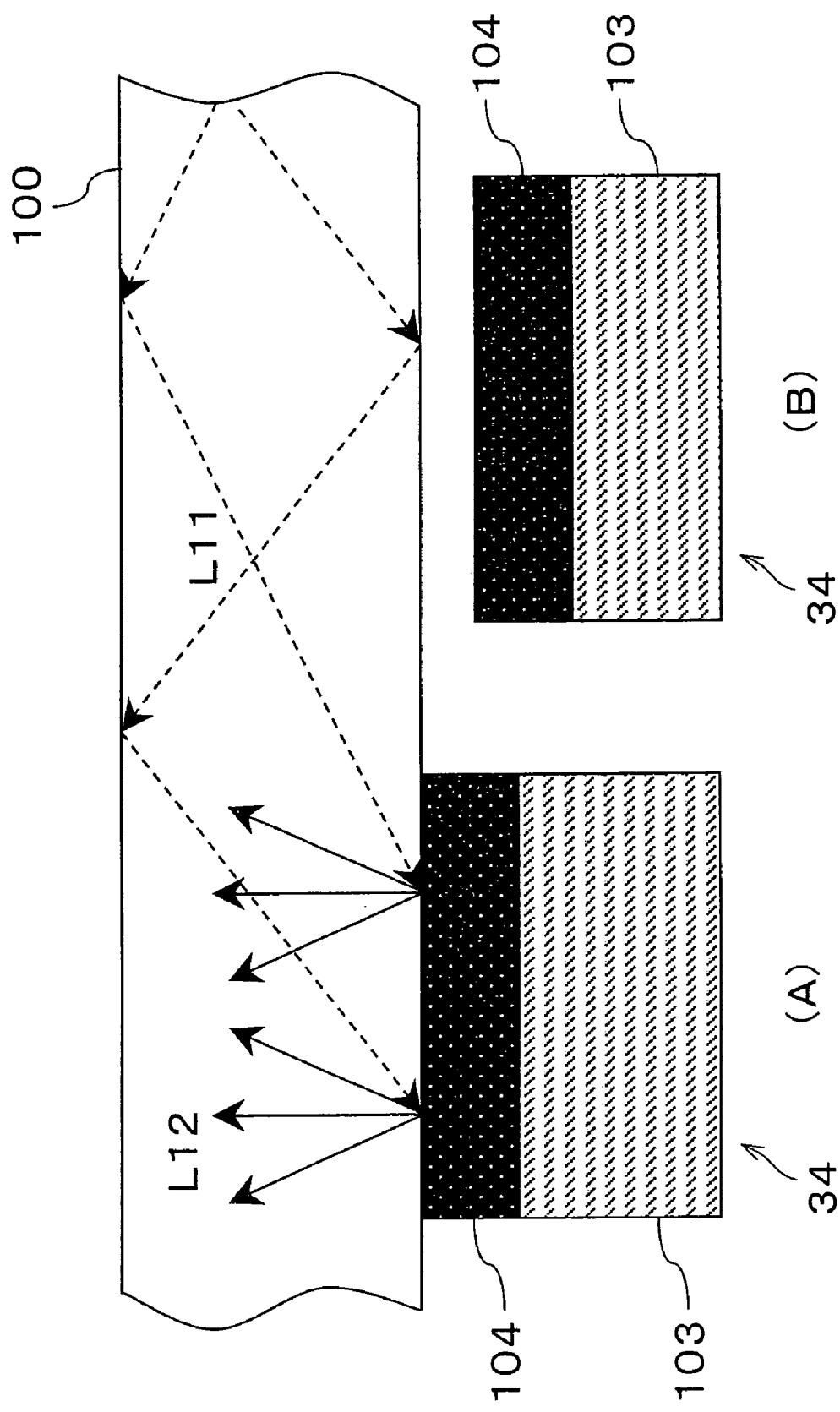
FIG. 3 is a cross sectional view illustrating a relationship between a piezoelectric element and the light guiding plate in the display device according to the First Embodiment of the present invention.

However, as shown in FIG. 3(A), when the organic resin 104 is brought into contact with the light guiding plate 100 by the piezoelectric element 103, light L11 propagating through the light guiding plate 100 hits the organic resin 104 and scatters. Here, scattered light L12 emerges from the light guiding plate 100 if it does not satisfy the condition of total reflection. In this case, the evanescent light of several wavelength ranges leaks out of the total reflection surface of the light guiding plate 100. Thus, in the present embodiment, the term "contact" refers to the situation where the distance between the surface of the organic resin 104 and the surface of the light guiding plate 100 is set to be shorter than the wavelength of propagating light. The wavelength of propagating light is the wavelength of display light, and therefore falls within the visible light range, i.e., 380 nm to 780 nm.

On the other hand, as shown in FIG. 3(B), when the organic resin 104 is not in contact with the light guiding plate 100, the propagating light inside the light guiding plate 100 does not scatter and is totally reflected. Here, the effects of the present invention can be obtained irrespective of whether the excited state of the piezoelectric element 103 is as shown in FIG. 3(A) in which the organic resin 104 is in contact with the light guiding plate 100, or as shown in FIG. 3(B) in which the organic resin 104 is not in contact with the light guiding plate 100. However, considering the adverse effect of wearing of the organic resin 104, the excited state as shown in FIG. 3(B) is more preferable.

Figure 4:
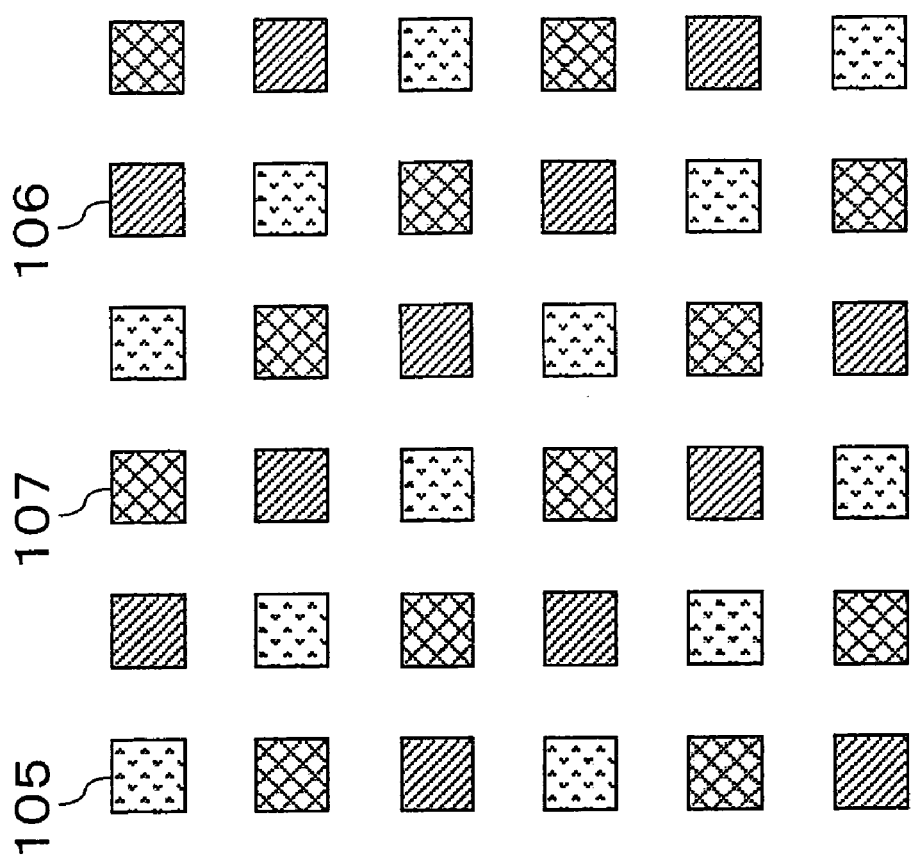
FIG. 4 is a plan view comparing aperture ratios, indicative of emitted light from the light guiding plate of the display device, between the present invention as represented by FIG. 4(a) and a conventional example (Patent Document 3) as represented by FIG. 4(b).
Figure 4:
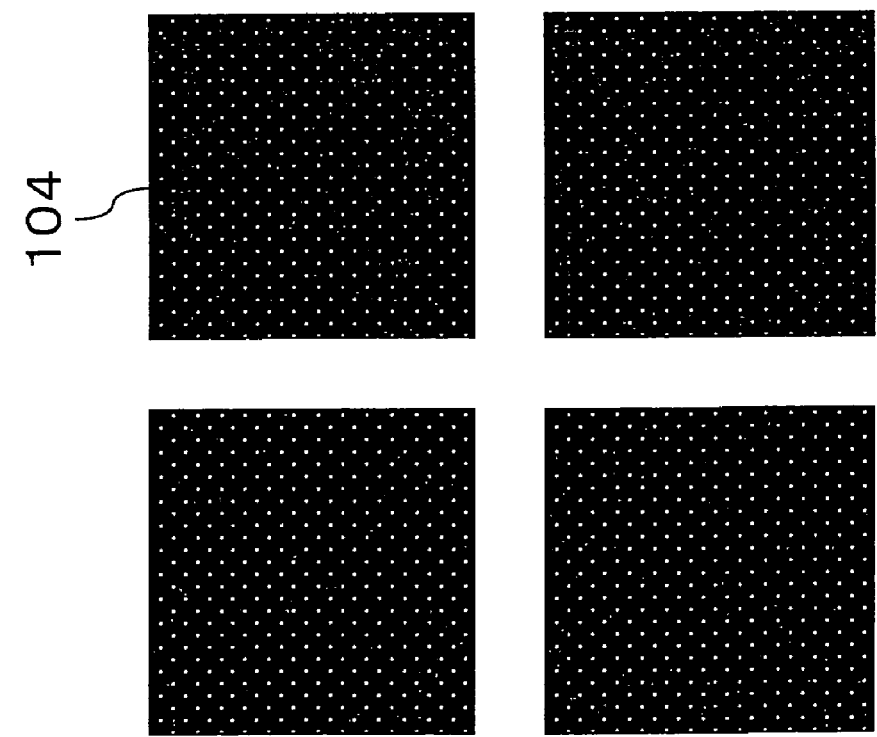

FIG. 4 compares numerical apertures between the present invention and a conventional example. As used herein, the numerical aperture refers to a proportion of an area of contact between the organic resin 104 and the light guiding plate 100, with respect to the area of the surface of the light guiding plate 100 on the far side of the liquid crystal panel 102. FIG. 4(a) relates to the present embodiment in which the piezoelectric element 103 and the organic resin 104 are used to scatter light, and FIG. 4(b) relates to the conventional example (Patent Document 3) in which the piezoelectric element and the organic resin are used as display pixels.

Referring to FIG. 4(b), for color display, the piezoelectric element needs to be provided with color filters that pass only specific colors. As such, a red filter 105, a green filter 106, and a blue filter 107 are provided. In this case, since light other than the specific colors is absorbed and lost, the efficiency of using light is poor. Further, since each pixel needs to be independently controlled for gradation display, the multiplicity of piezoelectric elements needs to be spaced apart from one another. Because the light does not pass through the gap between the piezoelectric elements, the numerical aperture is reduced.

On the other hand, in FIG. 4(a), the piezoelectric element 103 and the organic element 104 do not need to form pixels. Thus, the color filters are not required and the light of any color can be scattered and reflected. Further, because the proportion of the piezoelectric element 103 and the organic resin 104 can be increased with respect to the display pixels, the gap is reduced and the numerical aperture is increased. As a result, the light can be used more efficiently.

Figure 5:
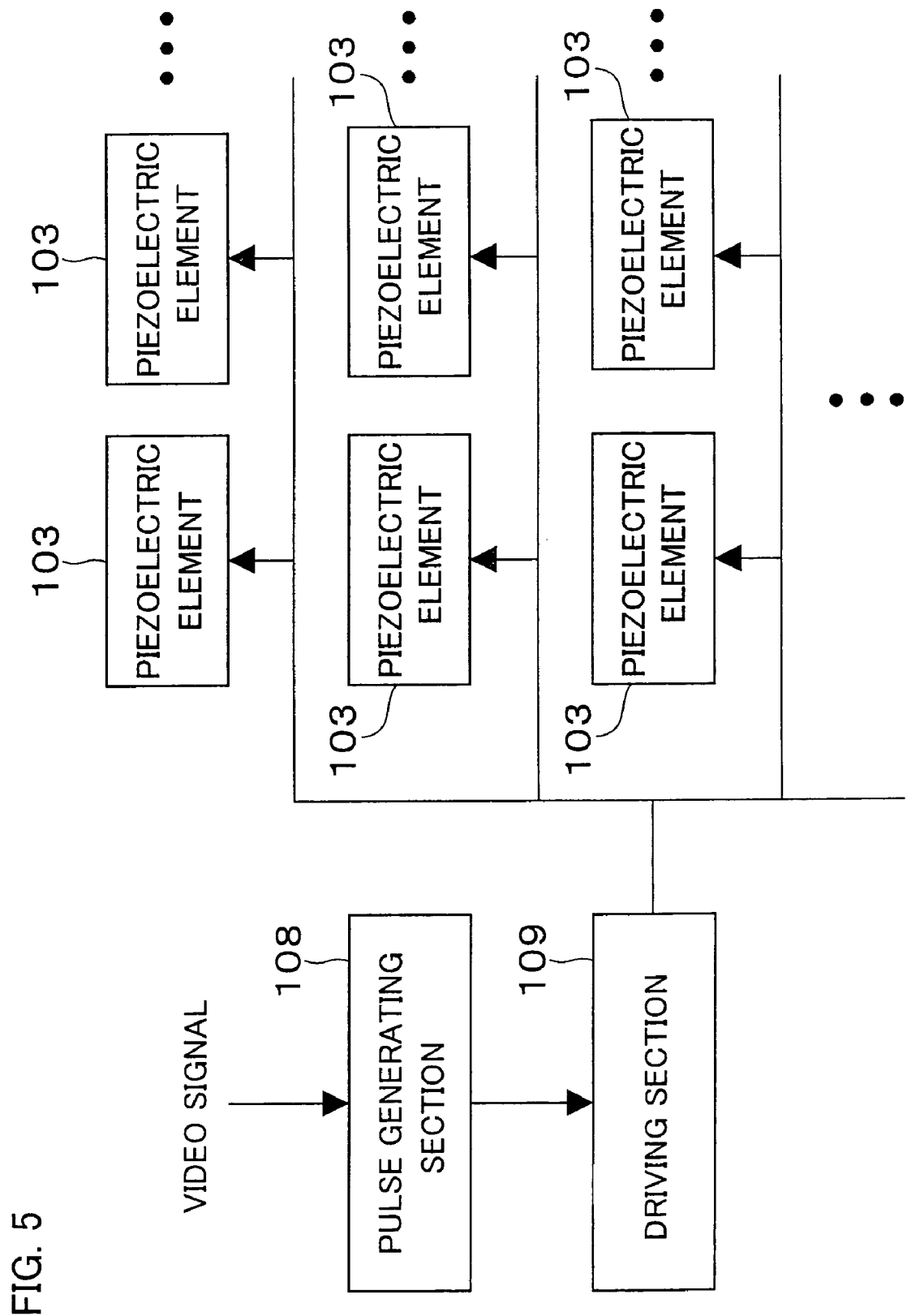
FIG. 5 is a block diagram illustrating a driving section, and a driving method, of the piezoelectric element provided in the display device according to the First Embodiment of the present invention.

FIG. 5 is a block diagram illustrating an example of a structure for controlling contact/non-contact of the piezoelectric element 103. The piezoelectric element 103 can be controlled by a pulse generating section 108 and a driving section 109, wherein the pulse generating section 108 receives a video signal for LCD display and generates a pulse signal for emitting or not emitting light, and the driving section 109 receives the pulse signal from the pulse generating section 108 and independently drives each piezoelectric element 103. That is, the timing at which voltage is applied to each piezoelectric element 103 to emit or not to emit light is controlled in synchronism with the display video signal.

Specifically, the piezoelectric element 103 is driven in synchronism with the scanning signal for the liquid crystal panel 102, i.e., the vertical synchronous signal and horizontal synchronous signal included in the video signal. In this way, whether to emit or not to emit light to each region of the liquid crystal panel 102 can be controlled at the timing when the response of the liquid crystal completes. For example, in units of groups of adjacent scanning lines, each piezoelectric element 103 is controlled and driven by the driving section 109 based on the scanning signal such that the light path control section 34, corresponding to the piezoelectric element 103, is brought into contact with or not brought into contact with the light guiding plate 100.

Figure 6:
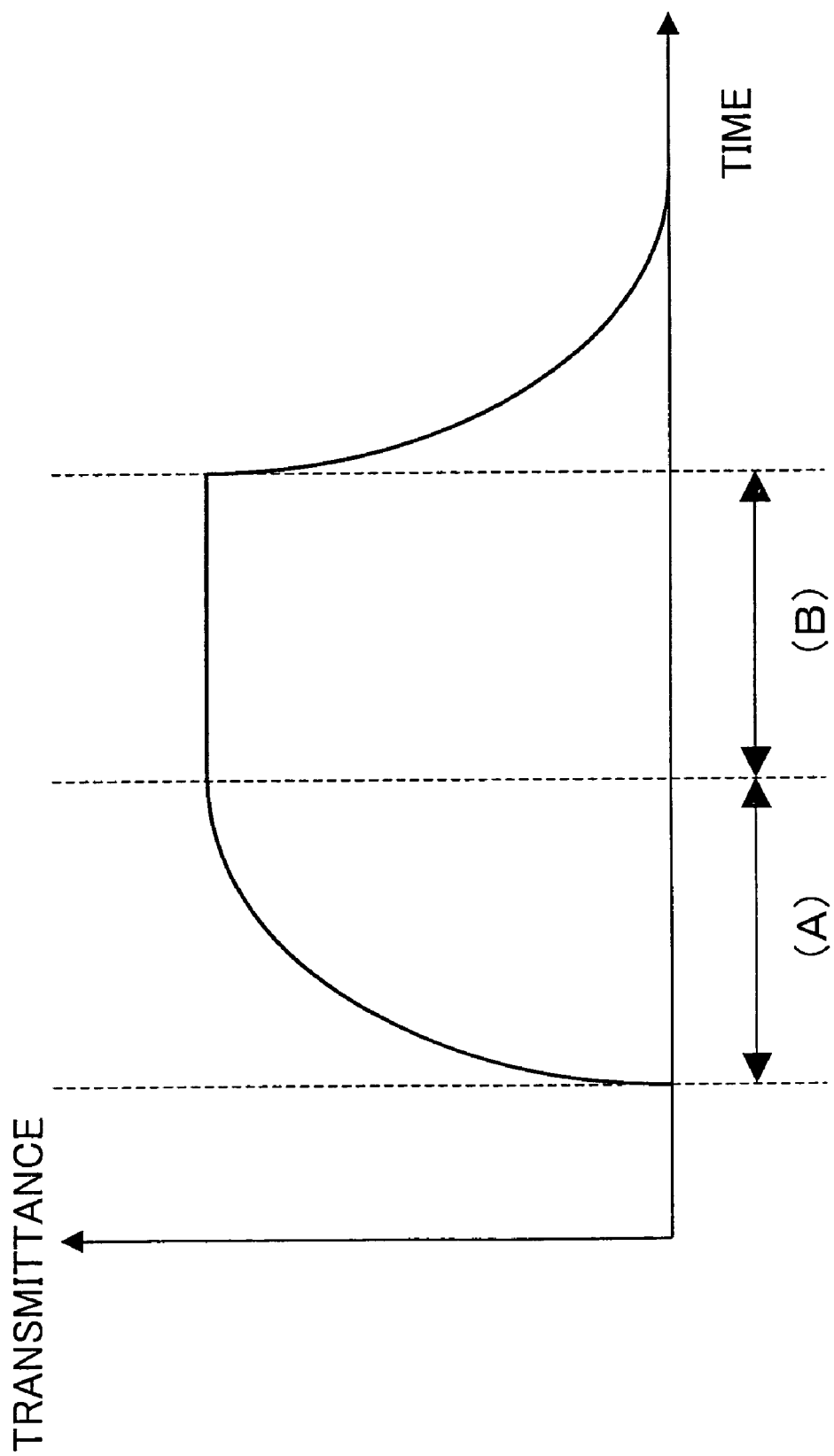
FIG. 6 is a timing chart representing liquid crystal response and illumination timing in the display device according to the First Embodiment of the present invention.

FIG. 6 represents a relationship between liquid crystal response and irradiation timing. In the representation shown in FIG. 6, the display changes from black to white and back to black, and the vertical axis and horizontal axis represent transmittance (gradation luminance) and time, respectively. In the liquid crystal panel 102, gradations are displayed by changing transmittance. Changing transmittance of the liquid crystal requires a certain time period. Thus, desired gradations cannot be displayed and the image deteriorates if light is emitted in the state where a required transmittance has not been attained and the transmittance is still changing (time zone (A) in FIG. 6). It is therefore preferable that light be emitted in the state where a required transmittance has been attained and the transmittance has stabilized (time zone (B) in FIG. 6).

In the present embodiment, images are displayed in gradations according to the transmittance of the liquid crystal panel 102. Therefore, the piezoelectric element 103 is only required to control whether to or not to emit light to the liquid crystal panel 102, and there is no need to control gradations. As such, the operation speed of the piezoelectric element 103 should be set such that it is operable at a desired timing in synchronism with the scanning signal for the liquid crystal panel 102.

In the time zone in which the response of the liquid crystal has been completed and stabilized, the ratio of illumination period and non-illumination period may be variably controlled by the piezoelectric element 103. In this way, images can be displayed on the liquid crystal display 102 with more gradations. Further, in order to set rough- gradations, the piezoelectric element 103 may control the quantity of light illuminating the liquid crystal panel 102. In this manner, the piezoelectric element 103 may be used to assist the actual gradation display performed on the liquid crystal panel 102.

Figure 7:
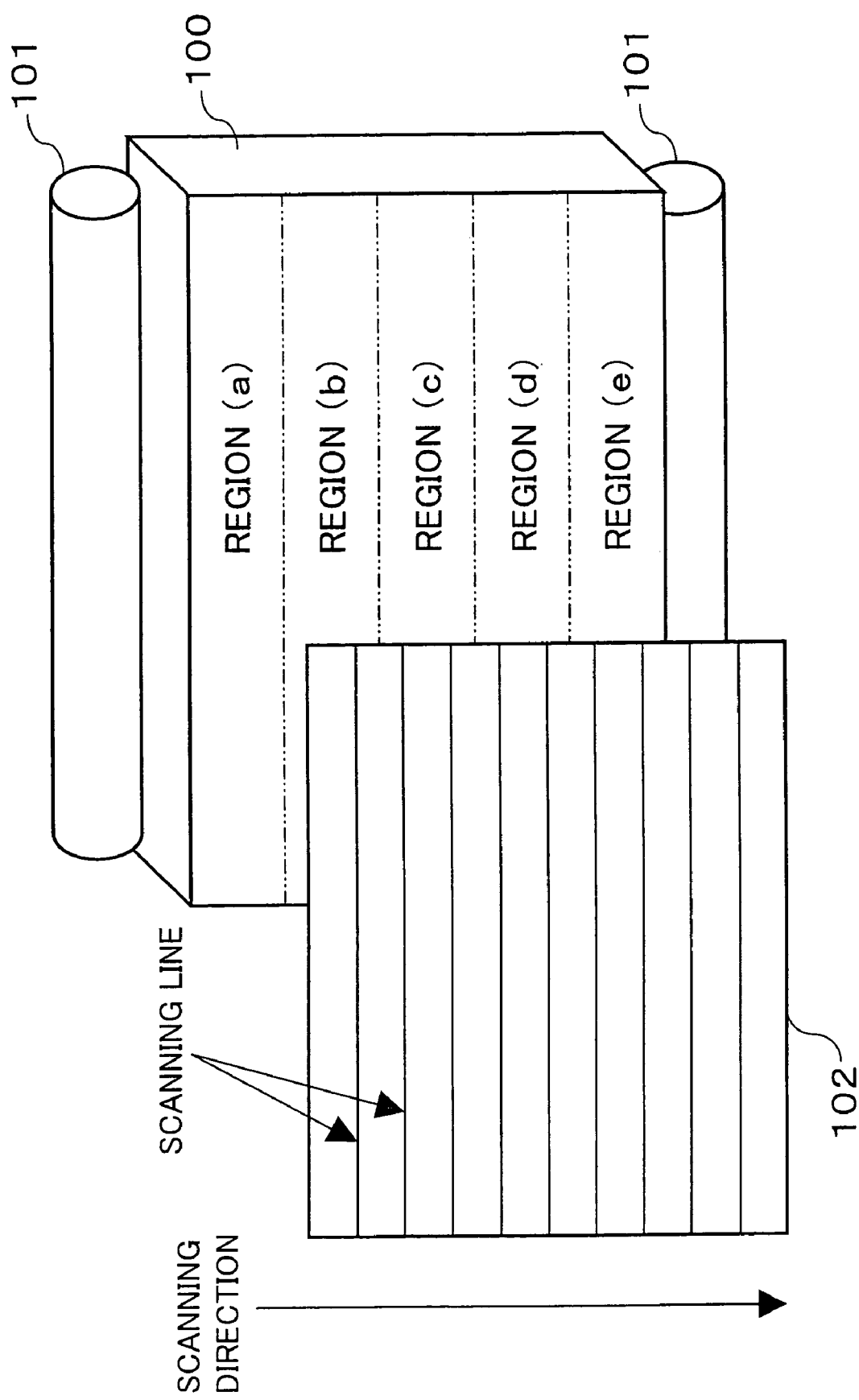
FIG. 7 is an exploded perspective view illustrating illumination regions of the display device according to the First Embodiment of the present invention.

FIG. 7 illustrates an example of light emitting regions on the surface of the light guiding plate 100 driven by the piezoelectric elements 103. In the example shown in FIG. 7, the surface of the light guiding plate 100 is divided into five adjacent regions (a) through (e) along the scanning direction (direction orthogonal to the scanning lines) of the liquid crystal panel 102.

Here, the entire surface of the liquid crystal panel 102 may be illuminated with light at the same timing within one frame period, and a non-illumination period may be set thereafter ("entire surface simultaneous flashing," in which light is flashed intermittently within one frame period). In this way, the quality of moving images in the hold-type display can be improved to approach that of the impulse-type display.

However, it is more preferable that the regions (a) through (e) sequentially emit light within one frame period at the timings described below. In this way, the liquid crystal panel 102 can have a substantially uniform liquid crystal response state when illuminated with light, thereby reducing display non-uniformity.

Figure 8:
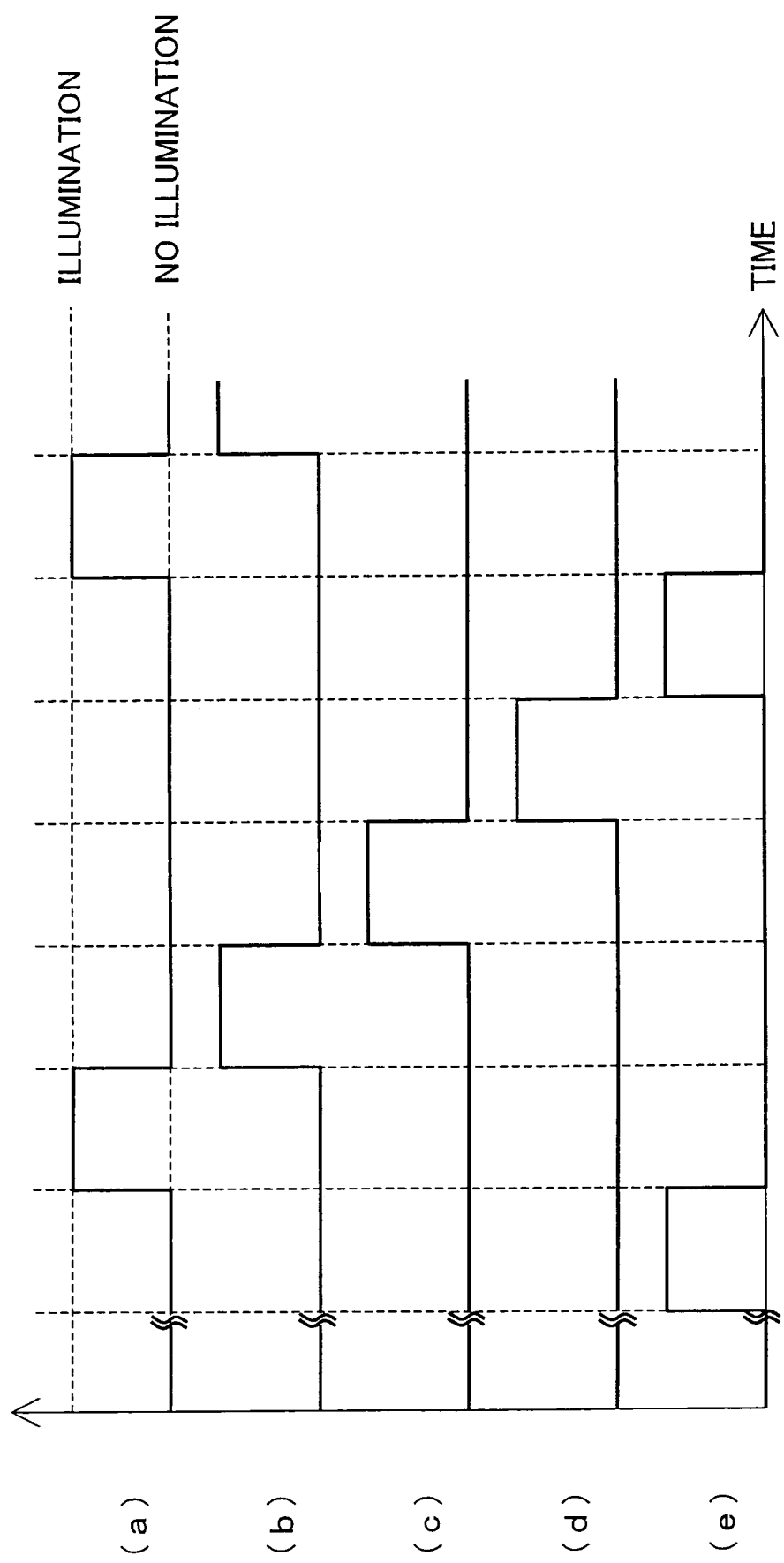
FIG. 8 is a timing chart representing a first example of illumination timings in the display device according to the First Embodiment of the present invention.

FIG. 8 shows respective waveforms of the regions (a) through (e), in which emission and non-emission of light are represented by the vertical axis, and time is represented by the horizontal axis. In the example of FIG. 8, illumination of light in the respective regions is controlled exclusively. Specifically, a region of the liquid crystal panel 102 corresponding to the region (a) is illuminated with light when the response of the liquid crystal in this region of the liquid crystal panel 102 is almost complete, and no light is emitted on the other regions. Next, when the response of the liquid crystal in a region of the liquid crystal panel 102 corresponding to the region (b) is almost complete, this region of the liquid crystal panel 102 is illuminated with light and no light is emitted on the other regions. Next, when the response of the liquid crystal in a region of the liquid crystal panel 102 corresponding to the region (c) is almost complete, this region of the liquid crystal panel 102 is illuminated with light and no light is emitted on the other regions. Next, when the response of the liquid crystal in a region of the liquid crystal panel 102 corresponding to the region (d) is almost complete, this region of the liquid crystal panel 102 is illuminated with light and no light is emitted on the other regions. Next, when the response of the liquid crystal in a region of the liquid crystal panel 102 corresponding to the region (e) is almost complete, this region of the liquid crystal panel 102 is illuminated with light and no light is emitted on the other regions.

Figure 9:
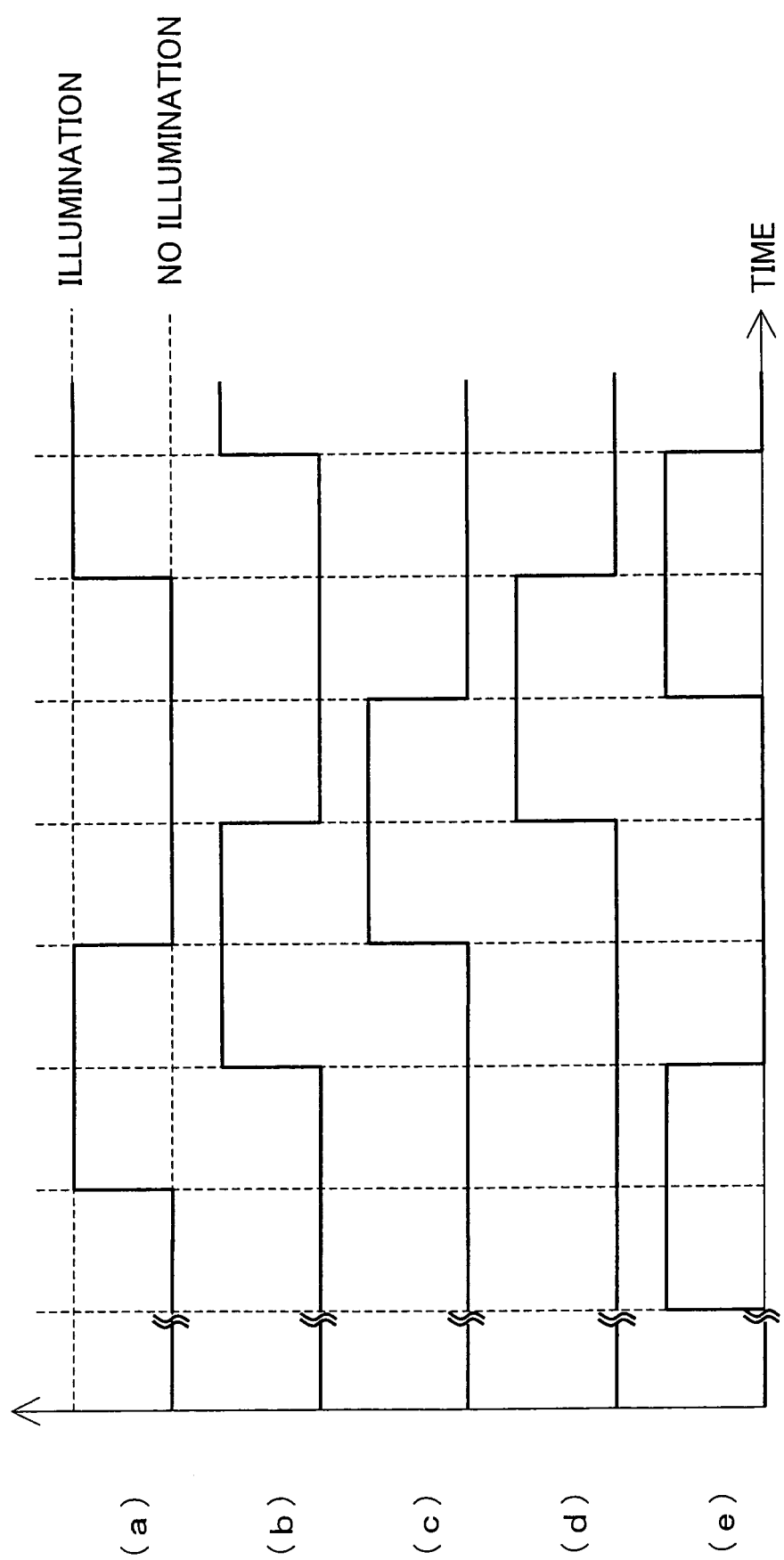
FIG. 9 is a timing chart representing a second example of illumination timings in the display device according to the First Embodiment of the present invention.

Alternatively, as shown in FIG. 9, driving of the piezoelectric elements 103 may be controlled in such a manner that the regions (a) and (b), regions (b) and (c), regions (c) and (d), regions (d) and (e), and regions (e) and (a) are illuminated in this order at the timings when the response of the liquid crystal completes.

Figure 10:
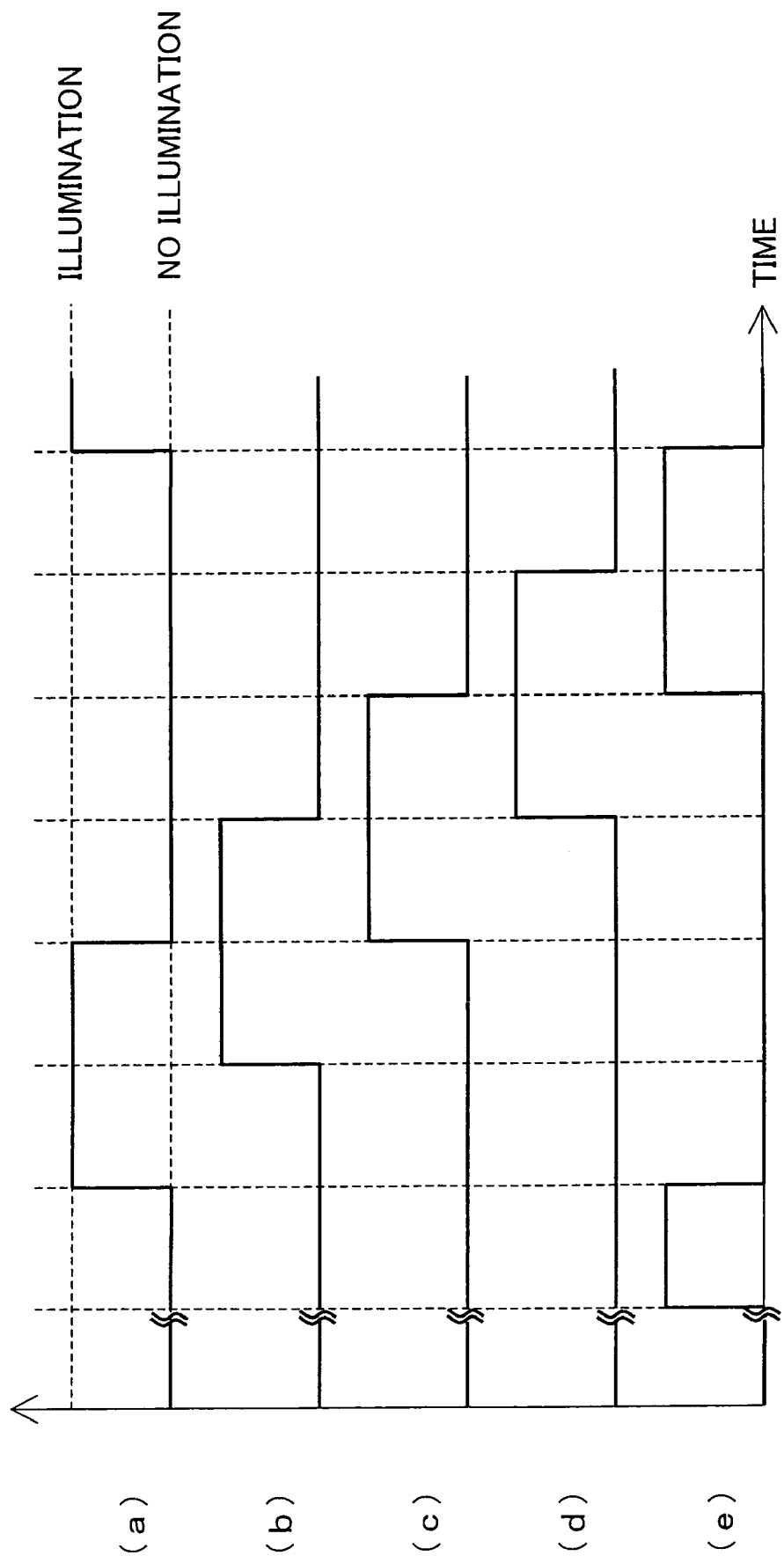
FIG. 10 is a timing chart representing a third example of illumination timings in the display device according to the First Embodiment of the present invention.

Further, as shown in FIG. 10, driving of the piezoelectric elements 103 may be controlled in such a manner that the region (a), regions (a) and (b), regions (b) and (c), regions (c) and (d), regions (d) and (e), and region (a) are illuminated in this order at the timings when the response of the liquid crystal completes.

FIG. 8 through FIG. 10 merely illustrate examples of illumination timing control. As such, FIG. 8 through FIG. 10 do not limit the quantity of illumination light or illumination time. Further, even though the light guiding plate 100 was divided into 5 regions, this is for convenience of explanation and the number of divided regions is not just limited to 5. Referring to FIG. 7, it is preferable that the light from the light source 101 enter the light guiding plate 100 from the side surface of the light guiding plate 100, in a direction parallel to the scanning lines for the liquid crystal panel 102. By allowing light to pass through all regions, the propagating light can emerge from the light guiding plate 100 even when an arbitrary one of the regions is emitting light. This improves the efficiency of using light.

Figure 11:
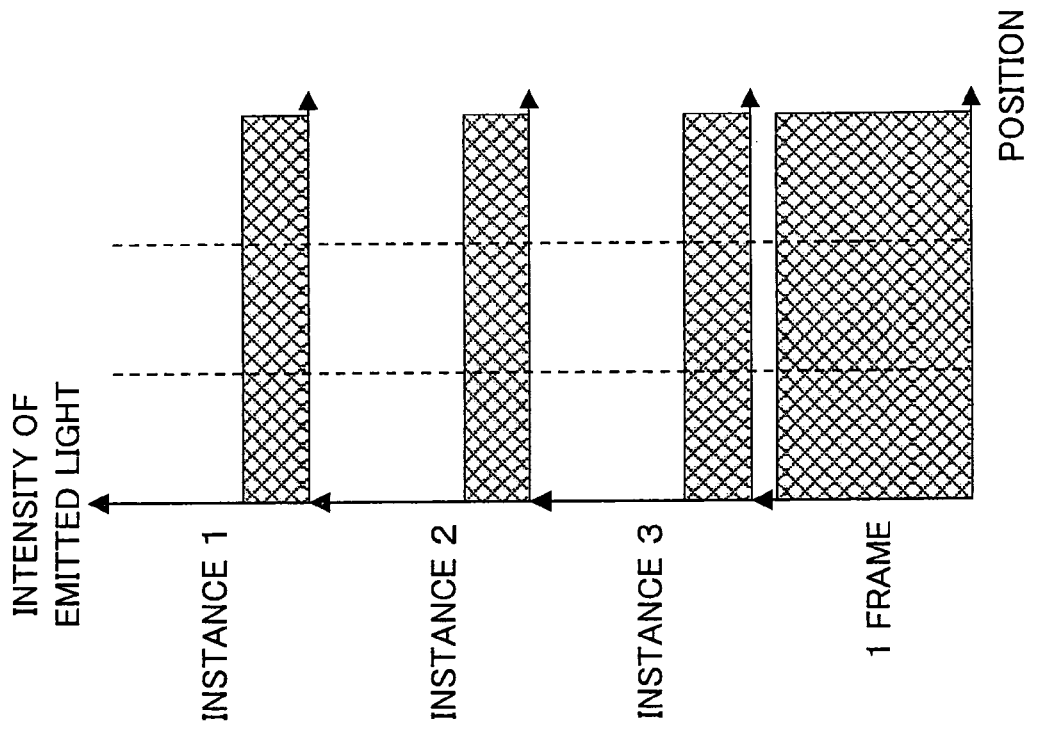
FIG. 11 is a waveform diagram of illumination time and illumination intensity represented in pulses, comparing quantities of emitted light between the display device of the present invention as shown in FIG. 11(a) and a conventional display device as shown in FIG. 11(b).
Figure 11:
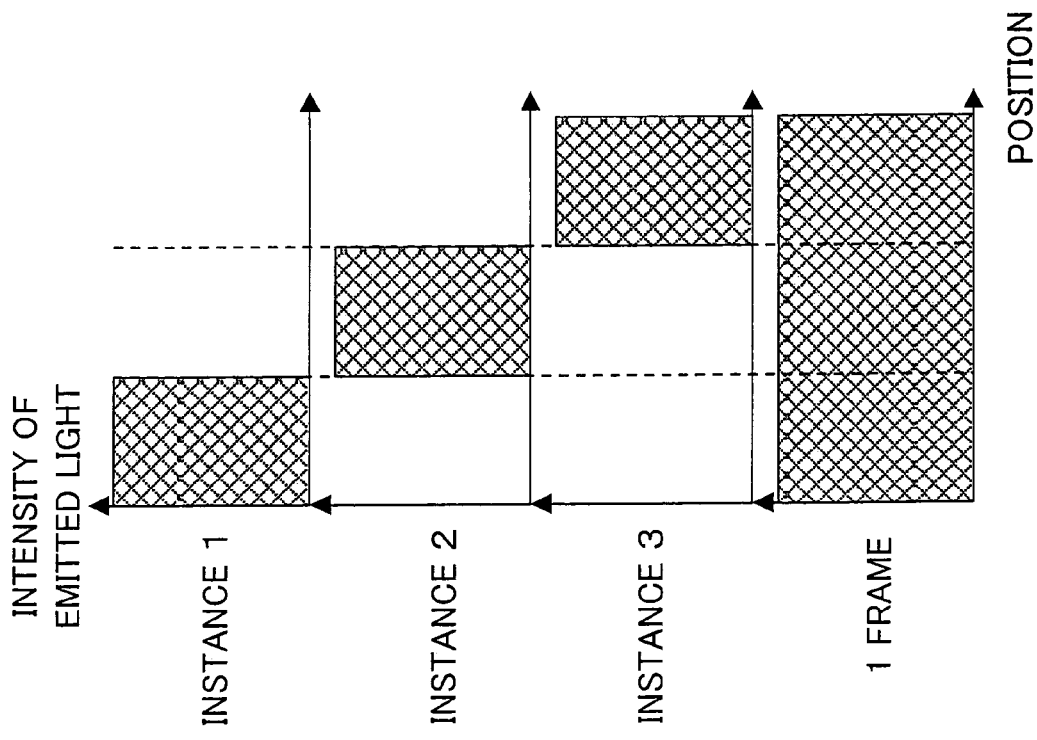

FIG. 11 represents intensity of irradiated light under different illumination conditions, and intensity of illumination light within one frame period, when the illumination region is divided into 3 regions according to the present embodiment. FIG. 11(a) represents impulse-type-like display in which the respective regions of the liquid crystal panel 102 are sequentially illuminated with light by driving the piezoelectric elements 103 in the manner described above. FIG. 11(b) represents hold-type display in which the entire surface of the liquid crystal panel 102 is illuminated at all times. The vertical axis indicates intensity of illumination light, wherein the intensity of illumination light in the hold-type display is 1. The horizontal axis indicates positions of the liquid crystal panel along the scanning direction, wherein the illumination region is divided into 3 regions.

Referring to FIG. 11(a), the propagating light in the non-illumination region of the light guiding plate 100 is totally reflected and does not illuminate the liquid crystal panel 102, and the incident light in the light guiding plate 100 illuminate the liquid crystal panel 102 only from the illumination region. Therefore, the spontaneous intensity of the illumination light is about three times greater than that of the hold-type display. As to the intensity of illumination light within one frame period, the total light intensity is the same as that in FIG. 11(b), even though FIG. 11(a) includes non-illumination periods.

In sum, by providing non-illumination periods within one frame period, a display device can be obtained that can perform impulse-type-like display, improve the quality of moving images, and allow for efficient use of light. The spontaneous intensity of illumination light can also be increased. Further, since there is only a few optical loss in the light guiding plate 100, the invention can accommodate a large display.

Second Embodiment

Figure 12:
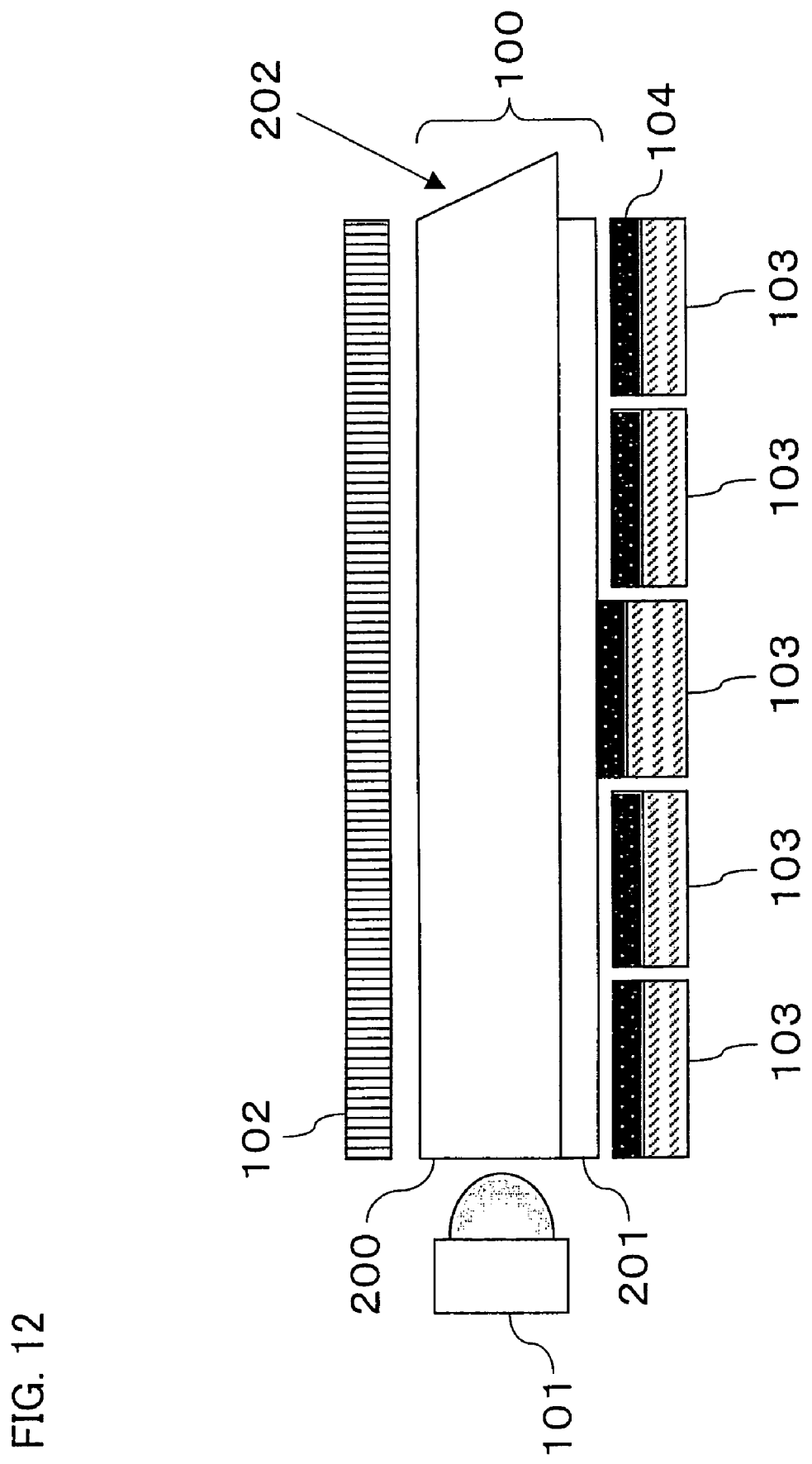
FIG. 12 is a cross sectional view illustrating an exemplary structure of a display device according to a Second Embodiment of the present invention.

FIG. 12 is a cross sectional view of a liquid crystal display device according to the present embodiment. In the present embodiment, the light guiding plate 100 includes a first layer 200 and a second layer 201. The second layer 201 is provided opposite the organic resin 104.

In the present embodiment, the light emitting element used for the light source 101 is a light emitting diode that emits light with narrow directivity. The light source 101 is provided on one end of the light guiding plate 100. On the opposite end, the first layer 200 of the light guiding plate 100 has a reflecting surface as light reflecting means 202. In order to use light more efficiently, the reflecting surface has a mirror member for causing light to propagate through the light guiding plate 100 mainly by specular reflection.

Figure 13:
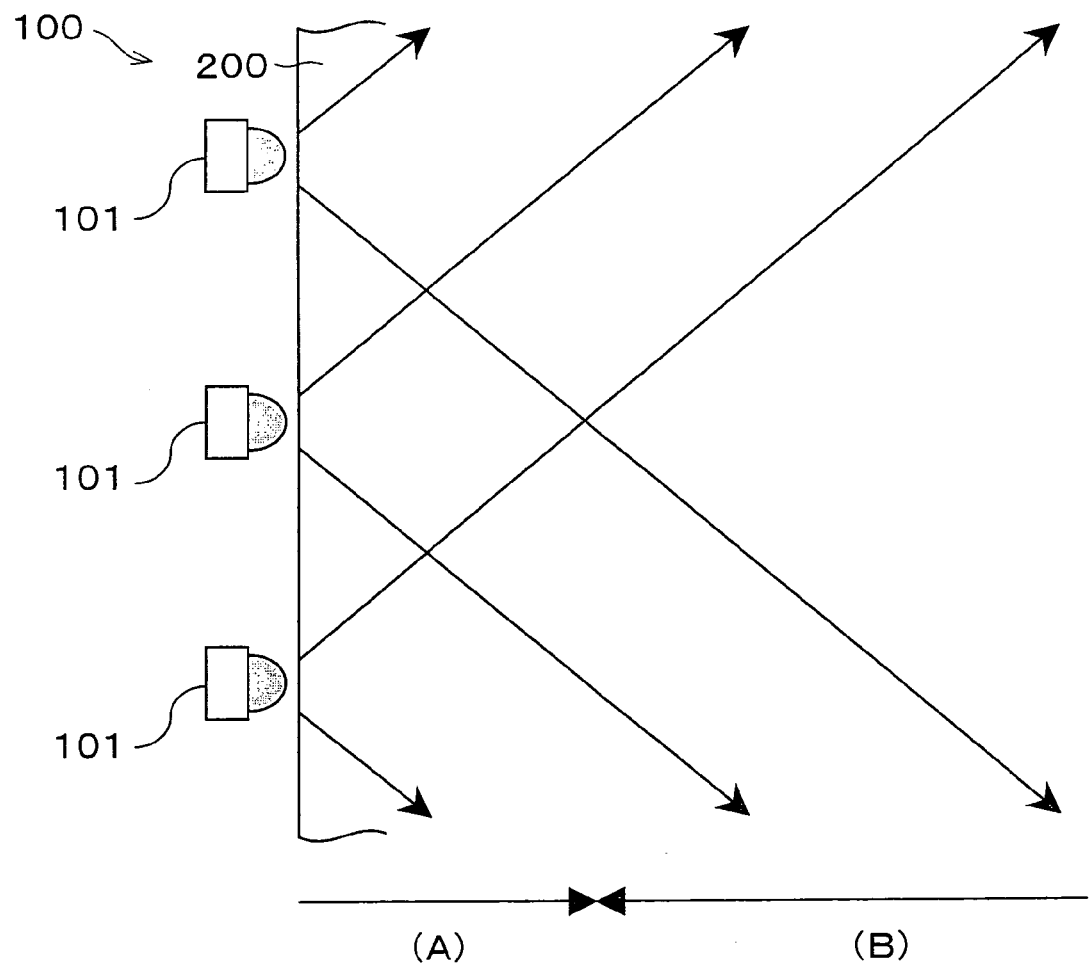
FIG. 13 is a plan view illustrating how luminance non-uniformity and color non-uniformity occur in the light guiding plate due to a point light source.

One way to improve display quality is to increase the range of color reproducibility. This can be achieved when the light source 101 uses light emitting diodes for emitting red, green, and blue with high color purity. However, since the light emitting diode is a point light source, use of light emitting diodes as the light source 101 creates a region (A) of non-uniform luminance and non-uniform color, as shown in FIG. 13.

In region (A), the light from the respective light emitting diodes do not mix sufficiently due to light directivity, and as such non-uniform luminance and non-uniform color result if the light propagating through region (A) falls on the liquid crystal panel 102. In region (B), since the distance from the light emitting diodes is sufficient to mix the emitted light, uniform white color is obtained. There according will be no non-uniform luminance or non-uniform color even when the light propagating through region (B) falls on the liquid crystal panel 102.

Figure 14:
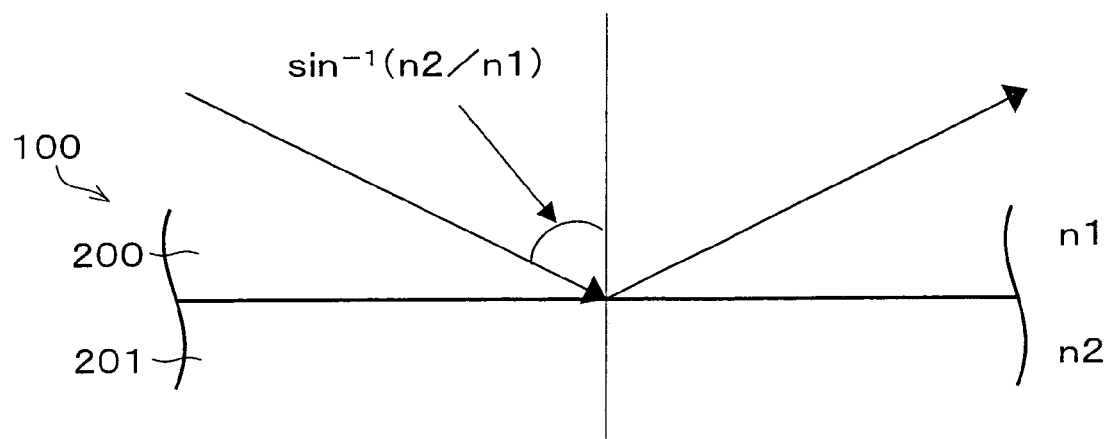
FIG. 14 is a cross sectional view illustrating angles of light that is propagated and totally reflected in the light guiding plate in the display device according to the Second Embodiment of the present invention.

The light guiding plate 100 of the present embodiment includes the first layer 200 and the second layer 201. Here, when the refractive index of the first layer 200 is n1, and when the refractive index of the second layer 201 is n2 (<n1), the light traveling from the first layer 200 to the second layer 201 is totally reflected at angles at or greater than $\sin^{-1}(n2/n1)$ shown in FIG. 14. As a result, the light is prevented from entering the second layer 201 and propagating therein. In the present embodiment, the angle $\sin^{-1}(n2/n1)$ is set as the angle at which the propagating light in the first layer 200 is incident on the second layer 201.

Specifically, incident light on the first layer 200 is controlled such that the light propagating in the first layer 200 is incident on the second layer 201 at or greater than $\sin^{-1}(n2/n1)$. In this way, the light propagates by being totally reflected inside the light guiding plate 100, and does not emerge therefrom. Here, the incident angle on the first layer 200 and therefore the propagation angle can be controlled by controlling the emitted light of the light emitting diodes, or with the use of a cylindrical lens.

Figure 15:
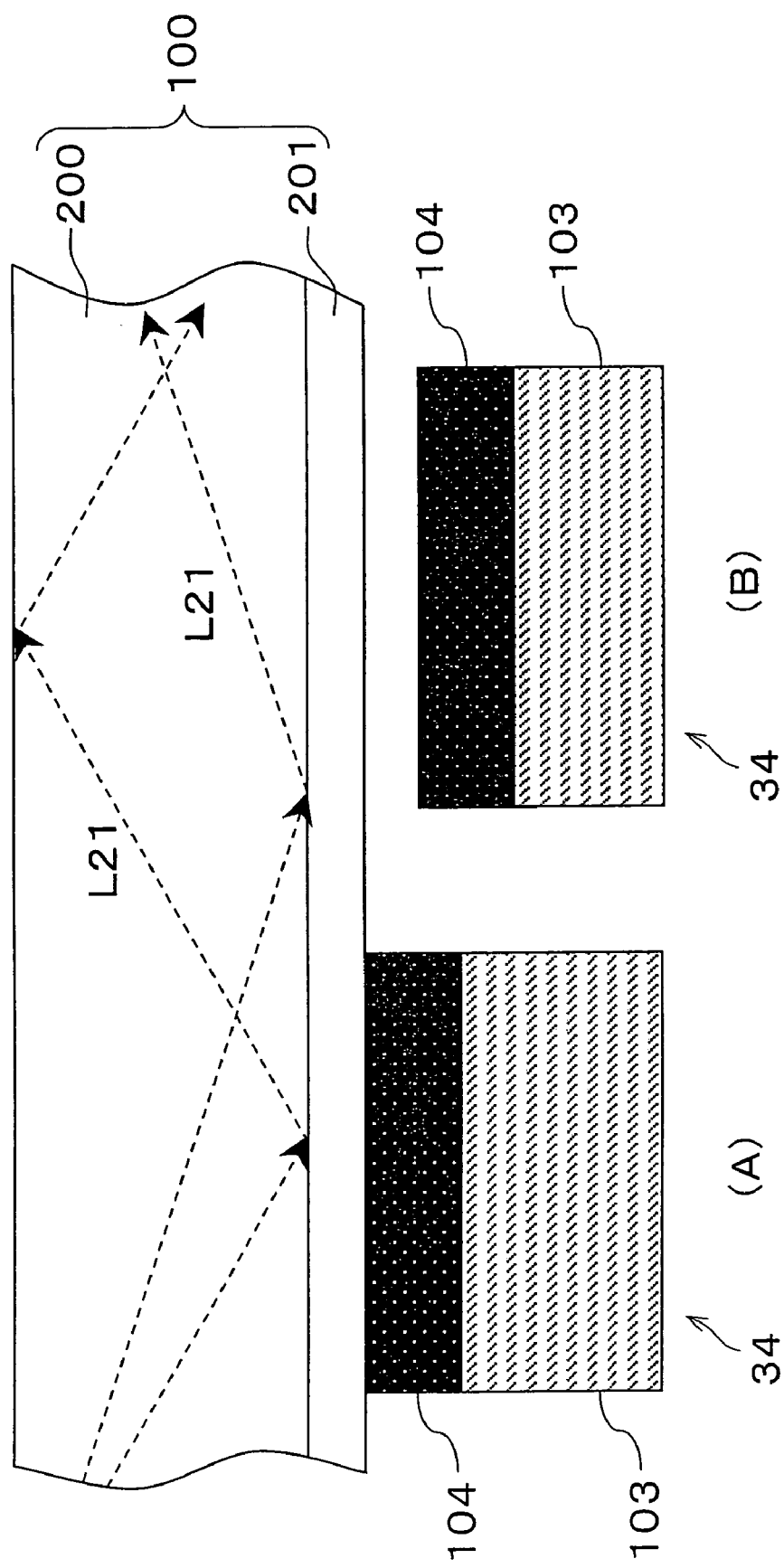
FIG. 15 is a cross sectional view representing a relationship between the piezoelectric element and the light guiding plate in the display device according to the Second Embodiment of the present invention.

Thus, the light from the light emitting diodes can be totally reflected and propagated only inside the first layer 200. Therefore, as shown in FIG. 15, the light L21 propagating inside the first layer 200 is not scattered and does not emerge from the light guiding plate 100, even when the organic resin 104 is brought into contact with the second layer 201 by the piezoelectric element 103. That is, the light L21 is totally reflected in the first layer 200 regardless of whether the organic resin 104 is brought into contact with or not brought into contact with the light guiding plate 100 by the piezoelectric element 103.

Figure 16:
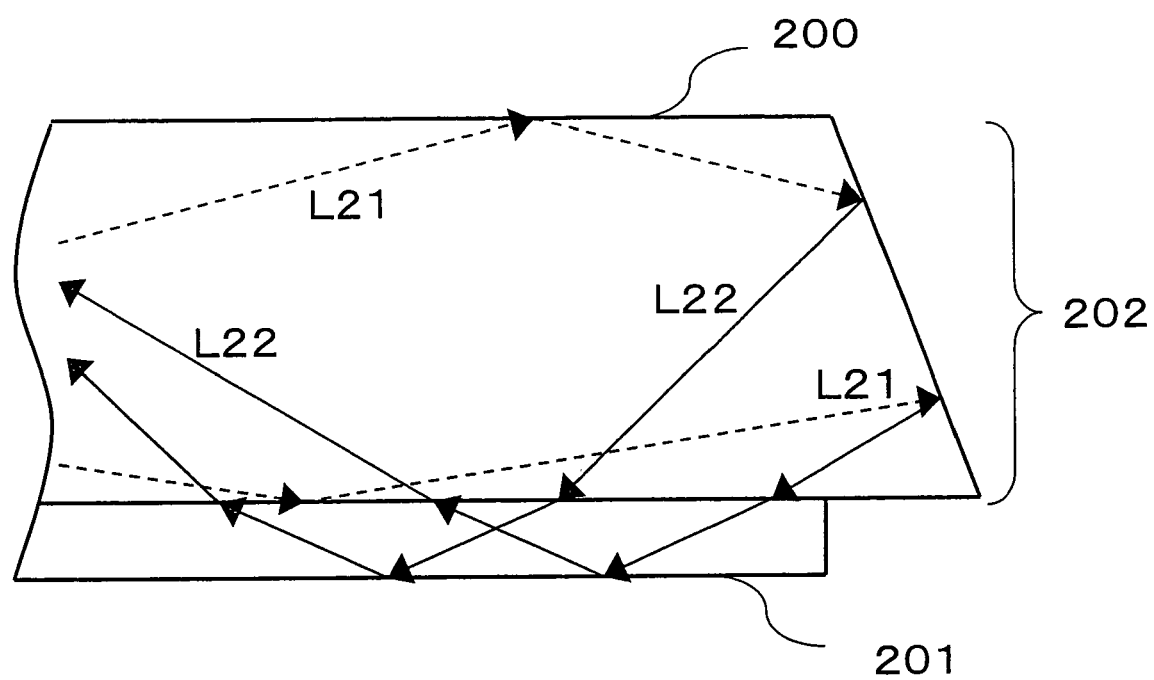
FIG. 16 is a cross sectional view illustrating a main portion of the light guiding plate of the display device according to the Second Embodiment of the present invention.

The light propagating inside the first layer 200 reaches the opposite end of the incident surface by undergoing total reflection repeatedly, without leaving the light guiding plate 100. As shown in FIG. 16, the light reflecting means 202 is provided on the opposite end of the incident surface. The light reflecting means 202 is realized by slanting the end surface of the first layer 200 and placing a mirror or the like thereon. The light propagating in the first layer 200 is reflected by the light reflecting means 202. Here, the propagation angle of the light is changed by the slanted end surface.

In the manner described above, the light L21 totally reflected inside the first layer 200 is converted into light L22 that is totally reflected in the first layer 200 and the second layer 201. That is, light L22 is produced that propagates by being totally reflected inside the light guiding plate 100. Here, since the light L22 propagates a sufficient distance from the light emitting diodes, the light from the light emitting diodes are sufficiently mixed, and uniform white light is obtained.

Figure 17:
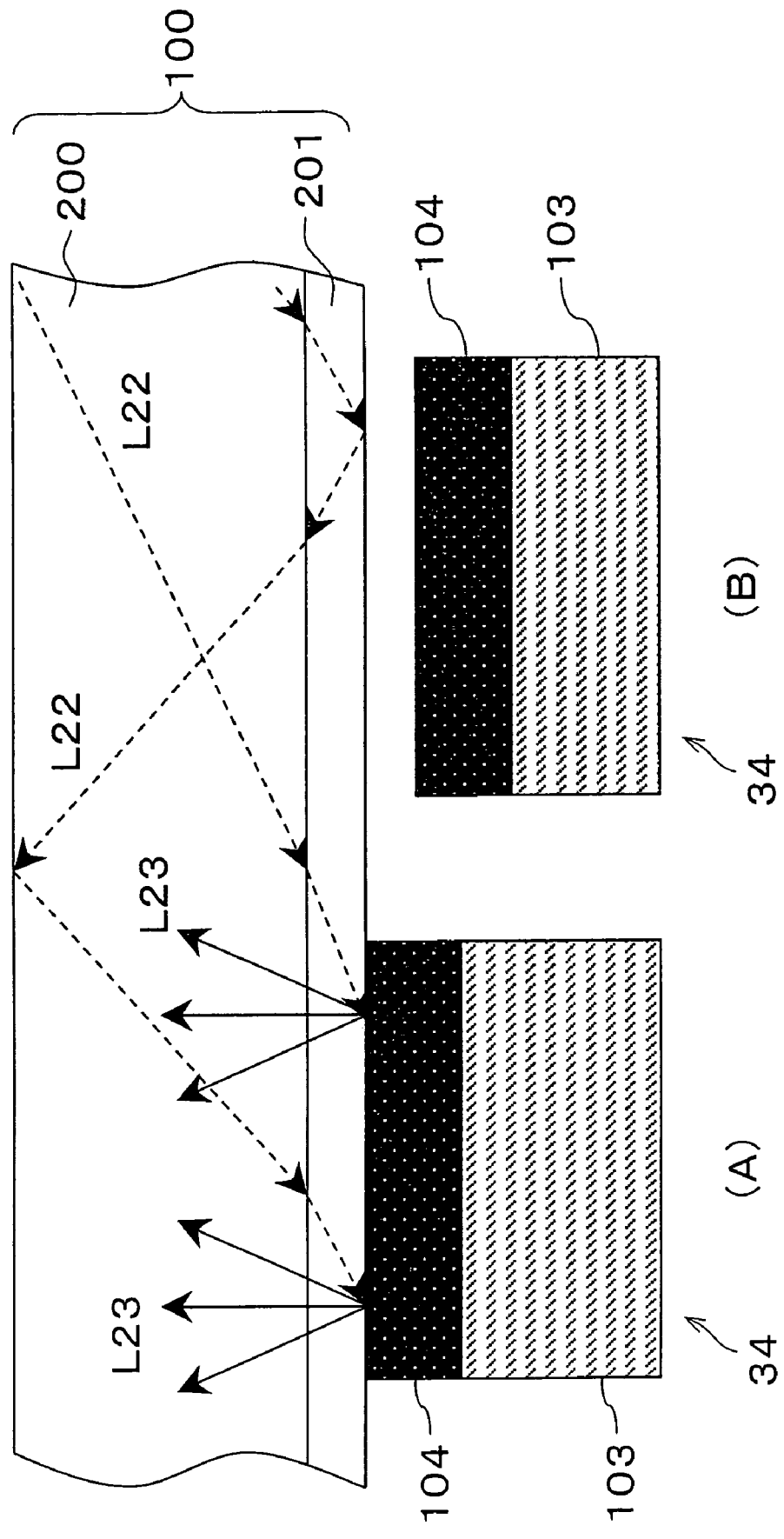
FIG. 17 is a cross sectional view representing a relationship between the piezoelectric element and the light guiding plate in the display device according to the Second Embodiment of the present invention.

As illustrated in FIG. 17, when the organic resin 14 is brought into contact with the second layer 201 by the piezoelectric element 103, the light L22 propagating in the light guiding plate 100 has a different propagation angle, and therefore scatters at the point of contact with the organic resin 104. As such, if the light L23 scattered by the organic resin 104 does not satisfy the conditions of total reflection in the light guiding plate 100, the light emerges from the light guiding plate 100 toward the liquid crystal panel 102.

On the other hand, when the organic resin 104 is not in contact with the second layer 201, the light L22 is totally reflected in the light guiding plate 100, and is not scattered by the organic resin 104. As a result, the light does not emerge from the light guiding plate 100.

In the manner described above, by controlling the driving of the piezoelectric element 103, the organic resin 104 can be brought into contact with or not in contact with the light guiding plate 100 in a controlled manner. This enables only desired portions of the liquid crystal panel 102 to be illuminated. Further, since the light 23 is uniform white light, luminance non-uniformity and color non-uniformity due to the point light source can be reduced. As to the timing of illuminating different regions, the method described in the First Embodiment can be employed.

Figure 18:
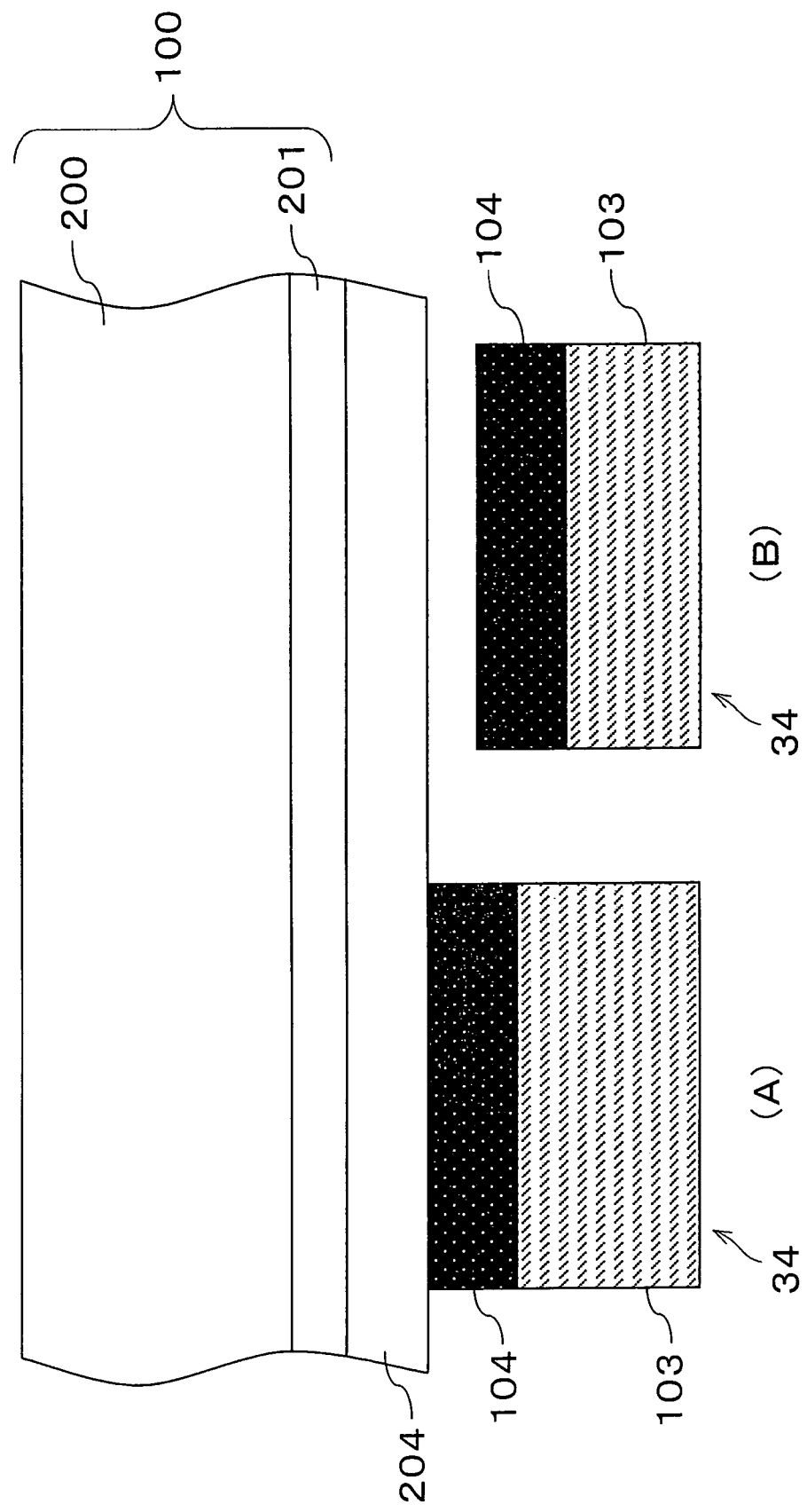
FIG. 18 is a cross sectional view representing a relationship between the piezoelectric element and the light guiding plate in the display device according to the Second Embodiment of the present invention.
Figure 19:
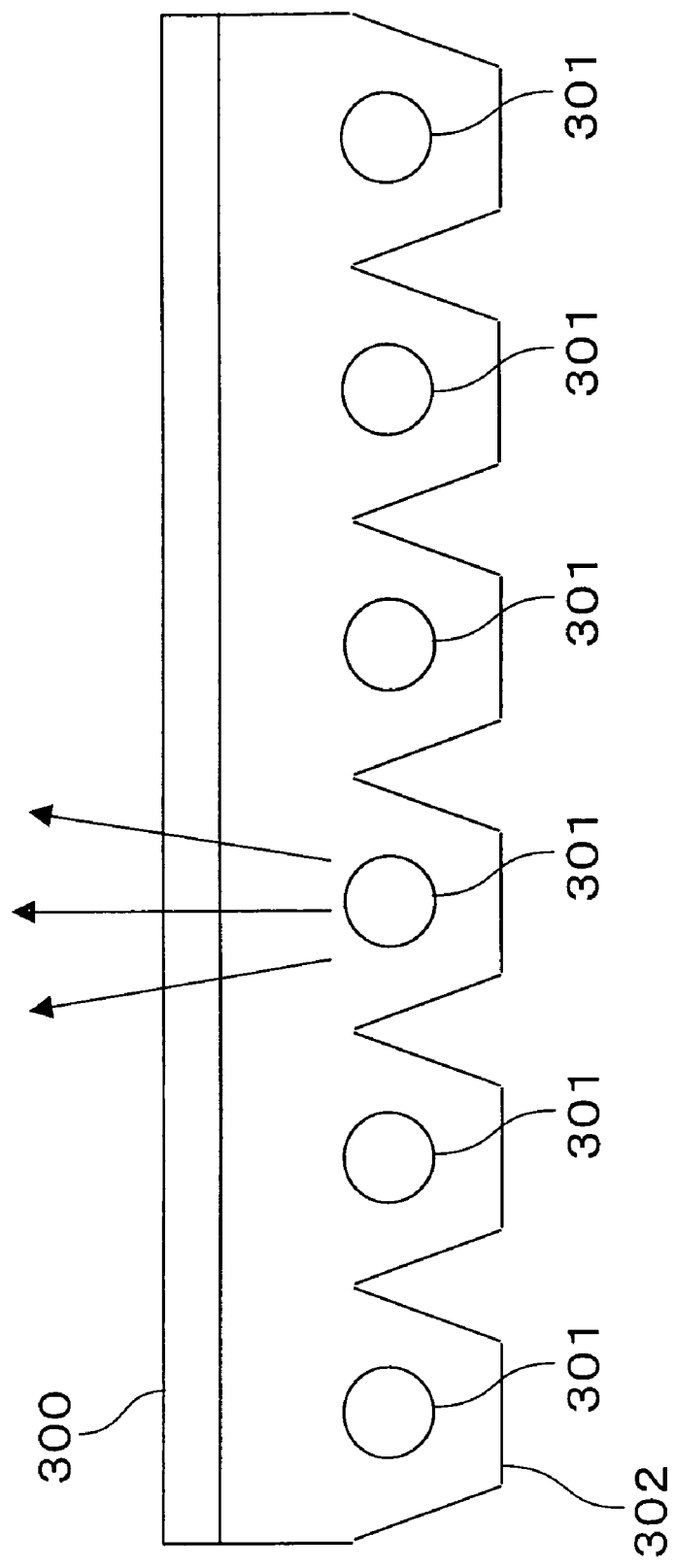
FIG. 19 is a cross sectional view illustrating an exemplary structure of a conventional display device.

A member having a greater refractive index than the second layer 201 may be interposed between the second layer 201 and the organic resin 104. For example, as shown in FIG. 18, a transmissive plate 203, such as an acrylic plate or a glass plate, may be provided. The transmissive plate 203 may be fabricated in one piece, via a spacer or the like, with a substrate used to form the piezoelectric element 103 and the organic resin 104. The transmissive plate 203 so formed is then simply bonded with the second layer 201 using an adhesive having a smaller refractive index than the first layer 200 or the transmissive plate.

With the described structure of the present embodiment, a display device can be easily obtained that can (1) improve a quality of moving images, (2) enables light to be used more efficiently, (3) increase the range of color reproducibility, and (4) reduce luminance non-uniformity and color non-uniformity.

As described above, a display device according to the present invention includes a liquid crystal panel having a plurality of pixels, and an illuminating unit for illuminating the liquid crystal panel using a light guiding plate, wherein the illuminating unit includes light path changing means for changing, by being brought into contact with or not in contact with the light guiding plate, a light path of propagating light inside the light guiding plate, so as to change intensity of light illuminating the liquid crystal panel.

According to this arrangement, the light path changing means varies the intensity of light illuminating the liquid crystal panel, and thereby provides an illumination period and a non-illumination period for the liquid crystal panel. This enables the liquid crystal panel to display moving images in an impulse-type-like display mode, thereby improving a quality of moving images.

Further, in the foregoing arrangement, the light propagating through the light guiding plate illuminates the liquid crystal panel in an illuminated state. In a non-illuminated state, the propagation light is totally reflected in the light guiding plate. Because the propagation light is maintained by being totally reflected in the light guiding plate in a non-illuminated state, a display device is realized in which the spontaneous luminance of the light illuminating the liquid crystal panel is increased, and in which light is used efficiently with minimum light loss.

The display device may be adapted so that the light path changing means includes a plurality of units, and that the plural units of the light path changing means are brought into contact with or not in contact with the light guiding plate one after another.

In this way, each different region of the liquid crystal panel can be illuminated or not illuminated with light sequentially. As a result, a desirable impulse-type-like display is realized that takes into consideration response timing of the liquid crystal.

The display device may be adapted so that the plural units of the light path changing means are brought into contact with or not in contact with the light guiding plate in synchronism with a scanning signal for the liquid crystal panel.

In this way, the liquid crystal can have substantially the same response state at the timing when the liquid crystal panel is illuminated with light. As a result, display non-uniformity on the display screen can be reduced.

Further, the display device may be adapted so that the light path changing means, which is independently brought into contact with or not in contact with the light guiding plate is individually brought into contact with the light guiding plate so as to illuminate plural pixels of the liquid crystal panel.

In this way, the area of contact between the light guiding plate and the light path changing means can be increased. This increases the quantity of light illuminating the liquid crystal panel, and thereby improves the efficiency of using light.

The display device may be adapted so that the plural units of the light path changing means, which are disposed parallel to the scanning line for the liquid crystal panel are simultaneously brought into contact with or not in contact with the light guiding plate.

With the illumination regions provided parallel to the scanning lines of the liquid crystal panel, light can be illuminated line sequentially in accordance with the line-sequential scanning of the liquid crystal panel. Further, driving control of the light path changing means can be simplified.

The display device may be adapted so that a light incident surface of the light guiding plate is substantially parallel to the scanning line for the liquid crystal panel.

In this way, in any given illumination region, it is ensured that incident light on the light guiding plate pass through the illumination region. This improves the efficiency of using light.

The display device may be adapted so that the light path changing means is brought into contact with the light guiding plate so as to illuminate a region of the liquid crystal panel in which liquid crystal has responded almost completely.

In this way, light illuminates the liquid crystal panel while the liquid crystal panel has desired gradations, enabling the liquid crystal panel to display the desired gradations.

Further, the display device may be adapted so that the light path changing means includes a piezoelectric element which brings the light path changing means into contact or not in contact with the light guiding plate.

With the piezoelectric element, the light path changing means can easily be brought into contact with or not in contact with the light guiding plate.

The display device may be adapted so that a surface of the light path changing means brought into contact with the light guiding plate comprises organic resin.

In this way, the organic resin improves the contact between the light path changing means and the light guiding plate. This increases the quantity of light that emerges from the light guiding plate, and thereby improves the efficiency of using light.

The display device may be adapted so that the light guiding plate includes: a first layer on which light is incident; a second layer having a smaller refractive index than the first layer; and a reflecting means, provided on an opposite surface of a light incident surface of the light guiding plate, for causing propagating light in the first layer to propagate also in the second layer.

In this way, a sufficient light path can be provided for the propagation light, and the propagation light can be mixed in the first layer. As a result, sufficiently mixed uniform light can be emitted from the light guiding plate.

Further, the display device may be adapted so that the incident light on the first layer is set such that an angle at which the propagating light in the first layer is incident on the second layer is no less than $\sin^{-1}(n2/n1)$, where n1 is the refractive index of the first layer, and n2 is the refractive index of the second layer.

In this way, the light propagating through the light guiding plate is mixed by being totally reflected in he first layer. As a result, even more uniform illumination light can be obtained.

The display device may be adapted to include a plurality of light emitting elements for emitting light into the light guiding plate. The display device may be adapted so that the light emitting elements emit a plurality of colors. The display device may be adapted so that the light emitting elements include at least one light emitting diode.

In this way, the intensity of light illuminated by the illuminating unit can be increased. Further, because plural colors are emitted, color purity can be increased and color reproducibility can be improved. Further, because the light emitting diodes can easily realize light emitting elements having a steep light spectrum, color reproducibility can also be improved.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

In a display device of the present invention, a liquid crystal panel is selectively illuminated with light that propagates through a light guiding plate. In this way, an illumination period and a non-illumination period are provided for the liquid crystal panel within one frame period.

Thus, the display device can display moving images on the liquid crystal panel in an impulse-type-like display mode, and therefore improves a quality of moving images. Further, since only desired illumination regions are illuminated, spontaneous luminance can be increased, and the light can be used more efficiently.

With the improved quality of moving images and improved efficiency of using light, the display device of the present invention can be suitably used as an electronic device such as a television or a monitor, or a portable device, which benefit greatly from the improved quality of moving images.

The invention claimed is:

1. A display device which includes a liquid crystal panel having a plurality of pixels, and an illuminating unit for illuminating the liquid crystal panel using a light guiding plate,
   wherein the illuminating unit comprises light path changing means for changing, by being brought into contact with or not in contact with the light guiding plate, a light path of propagating light inside the light guiding plate, so as to change intensity of light illuminating the liquid crystal panel,
   a number of the light path changing means being smaller than a number of the pixels of the liquid crystal panel, and
   one of the light path changing means, which is able to independently be brought into contact with or not in contact with the light guiding plate, being brought into contact with the light guiding plate in such a way as to allow the pixels of the liquid crystal panel to be illuminated.

2. A display device as set forth in claim 1,
   wherein the light path changing means comprises a plurality of units, and
   wherein the plural units of the light path changing means are brought into contact with or not in contact with the light guiding plate one after another.

3. A display device as set forth in claim 2, wherein the plural units of the light path changing means are brought into contact with or not in contact with the light guiding plate in synchronism with a scanning signal for the liquid crystal panel.

4. A display device as set forth in claim 1, wherein the light path changing means, which is independently brought into contact with or not in contact with the light guiding plate is individually brought into contact with the light guiding plate so as to illuminate plural pixels of the liquid crystal panel.

5. A display device as set forth in claim 1, wherein the light path changing means comprises a plurality of units, and the plural units of the light path changing means, which are disposed parallel to the scanning line for the liquid crystal panel are simultaneously brought into contact with or not in contact with the light guiding plate.

6. A display device as set forth in claim 1, wherein the light path changing means is brought into contact with the light guiding plate so as to illuminate a region of the liquid crystal panel in which liquid crystal has responded almost completely.

7. A display device as set forth in claim 1, wherein the light path changing means includes a piezoelectric element which brings the light path changing means into contact or not in contact with the light guiding plate.

8. A display device as set forth in claim 1, wherein a surface of the light path changing means brought into contact with the light guiding plate comprises organic resin.

9. A display device as set forth in claim 1,
   wherein the light guiding plate includes:
   a first layer on which light is incident;
   a second layer having a smaller refractive index than the first layer; and
   a reflecting means, provided on an opposite surface of a light incident surface of the light guiding plate, for causing propagating light in the first layer to propagate also in the second layer.

10. A display device as set forth in claim 9, wherein the incident light on the first layer is set such that an angle at which the propagating light in the first layer is incident on the second layer is no less than $\sin^{-1}(n2/n1)$, where n1 is the refractive index of the first layer, and n2 is the refractive index of the second layer.

11. A display device as set forth in claim 1, comprising a plurality of light emitting elements for emitting light into the light guiding plate.

12. A display device as set forth in claim 11, wherein the light emitting elements emit a plurality of colors.

13. A display device as set forth in claim 11, wherein the light emitting elements include at least one light emitting diode.

14. The display device as set forth in claim 1, wherein a plurality of the light path changing means are provided,
   the plurality of light path changing means being provided in parallel to scanning lines of the liquid crystal panel and being brought into contact with or not in contact with the light guiding plate in synchronization with a scanning signal of the liquid crystal panel, and
   the illuminating unit has an illumination period and a non-illumination period within one frame period.

* * * * *